(12) United States Patent
Couture

(10) Patent No.: US 12,459,727 B2
(45) Date of Patent: Nov. 4, 2025

(54) PACKAGING CONTAINERS AND ASSOCIATED SYSTEMS AND PACKAGING METHODS

(71) Applicant: WestRock Shared Services, LLC, Atlanta, GA (US)

(72) Inventor: David G. Couture, Hoschton, GA (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 18/013,702

(22) PCT Filed: Jun. 30, 2021

(86) PCT No.: PCT/US2021/039807
§ 371 (c)(1),
(2) Date: Dec. 29, 2022

(87) PCT Pub. No.: WO2022/006224
PCT Pub. Date: Jan. 6, 2022

(65) Prior Publication Data
US 2023/0294911 A1    Sep. 21, 2023

Related U.S. Application Data

(60) Provisional application No. 63/046,255, filed on Jun. 30, 2020.

(51) Int. Cl.
*B65D 85/52*        (2006.01)
*B65B 25/02*        (2006.01)
(Continued)

(52) U.S. Cl.
CPC ............ *B65D 85/52* (2013.01); *B65B 25/026* (2013.01); *B65D 5/328* (2013.01); *B65D 5/5007* (2013.01);
(Continued)

(58) Field of Classification Search
CPC .... A01G 13/00; A01G 13/02; A01G 13/0206; A01G 13/0212; A01G 13/0225;
(Continued)

(56) References Cited

U.S. PATENT DOCUMENTS 2,150,453 A * 3/1939 Mulford .................... B65D 5/50
                                                    47/84
4,184,597 A * 1/1980 Gavin ................... B65D 5/5415
                                                   229/230
(Continued)

FOREIGN PATENT DOCUMENTS

FR      2467796      *  4/1981   ............... A01G 5/06
FR      2467796 A1   *  4/1981   ............... A01G 5/06
(Continued)

OTHER PUBLICATIONS

International Search Report issued in PCT/US2021/039807, dated Oct. 27, 2021.

*Primary Examiner* — Anthony D Stashick
*Assistant Examiner* — Marcos Javier Rodriguez Molina
(74) *Attorney, Agent, or Firm* — Neil G. Cohen; Rohini K. Garg

(57) ABSTRACT

Provided is a packaging container including a plurality of sidewall panels. The plurality of sidewall panels may include at least a first sidewall panel and a second sidewall panel connected to the first sidewall panel along a predefined corner fold line. The packaging container may further include a push-in feature located on the predefined corner fold line. The push-in feature may be movable between a first configuration and a second configuration. A tear-away piece may be located on at least one sidewall panel of the plurality of sidewall panels. The packaging container may include a top wall defined by a plurality of top panels. In an example, the packaging container includes a bottom wall defined by a plurality of bottom panels. In an example, the
(Continued)

packaging container includes an insert. The packaging container may house a potted plant.

20 Claims, 18 Drawing Sheets

(51) Int. Cl.
 *B65D 5/32* (2006.01)
 *B65D 5/50* (2006.01)
 *B65D 5/54* (2006.01)
 *B65D 5/56* (2006.01)
(52) U.S. Cl.
 CPC ............ *B65D 5/5038* (2013.01); *B65D 5/542* (2013.01); *B65D 5/563* (2013.01)
(58) Field of Classification Search
 CPC ............ A01G 13/0231; A01G 13/0237; A01G 13/0243; A01G 13/025; A01G 13/0268; A01G 13/0281; A01G 13/04; A01G 13/043; A01G 13/10; A01G 13/105; A01G 17/00; A01G 17/005; A01G 17/02; A01G 18/00; A01G 18/20; A01G 18/60; A01G 18/62; A01G 18/64; A01G 18/65; A01G 18/66; A01G 18/68; A01G 18/69; A01G 18/70; A01G 2/00; A01G 2/10; A01G 2/30; A01G 2/35; A01G 2/38; A01G 2009/003; A01G 2013/006; A01G 22/00; A01G 22/05; A01G 22/15; A01G 22/25; A01G 22/35; A01G 22/40; A01G 22/60; A01G 22/63; A01G 23/02; A01G 23/04; A01G 23/043; A01G 23/046; A01G 23/06; A01G 24/00; A01G 24/12; A01G 24/13; A01G 24/15; A01G 24/18; A01G 24/20; A01G 24/22; A01G 24/28; A01G 24/30; A01G 24/35; A01G 24/40; A01G 24/44; A01G 24/46; A01G 24/48; A01G 24/50; A01G 24/60; A01G 25/14; A01G 27/00; A01G 27/001; A01G 27/003; A01G 27/005; A01G 27/006; A01G 27/008; A01G 27/02; A01G 27/04; A01G 27/06; A01G 29/00; A01G 3/00; A01G 31/00; A01G 31/02; A01G 31/06; A01G 33/00; A01G 5/00; A01G 5/02; A01G 5/04; A01G 5/06; A01G 7/00; A01G 7/04; A01G 7/045; A01G 7/06; A01G 9/00; A01G 9/006; A01G 9/02; A01G 9/021; A01G 9/022; A01G 9/023; A01G 9/024; A01G 9/025; A01G 9/026; A01G 9/027; A01G 9/028; A01G 9/029; A01G 9/0291; A01G 9/0293; A01G 9/0295; A01G 9/0297; A01G 9/0299; A01G 9/033; A01G 9/04; A01G 9/042; A01G 9/045; A01G 9/047; A01G 9/083; A01G 9/086; A01G 9/088; A01G 9/12; A01G 9/16; A01G 9/20; A01G 9/24; A01G 9/243; A01G 9/246; A01G 9/247; A01G 9/249; A01G 9/26; B65B 25/026; B65B 1/00; B65B 1/02; B65B 1/04; B65B 1/06; B65B 1/20; B65B 1/22; B65B 1/24; B65B 1/26; B65B 1/30; B65B 1/32; B65B 1/36; B65B 1/363; B65B 1/48; B65B 11/00; B65B 11/004; B65B 11/02; B65B 11/025; B65B 11/045; B65B 11/06; B65B 11/08; B65B 11/10; B65B 11/12; B65B 11/22; B65B 11/28; B65B 11/50; B65B 11/52; B65B 11/54; B65B 11/58; B65B 11/585; B65B 13/02; B65B 13/04; B65B 13/18; B65B 13/181; B65B 13/185; B65B 13/20; B65B 13/22; B65B 15/00; B65B 15/04; B65B 17/00; B65B 17/02; B65B 17/025; B65B 19/02; B65B 19/20; B65B 19/22; B65B 19/223; B65B 19/226; B65B 19/228; B65B 19/28; B65B 19/32; B65B 19/34; B65B 2039/009; B65B 21/00; B65B 21/02; B65B 21/025; B65B 21/04; B65B 21/06; B65B 21/12; B65B 21/14; B65B 21/18; B65B 21/183; B65B 21/186; B65B 21/20; B65B 21/22; B65B 21/24; B65B 21/242; B65B 21/245; B65B 2210/02; B65B 2210/04; B65B 2210/06; B65B 2210/20; B65B 2220/06; B65B 2220/08; B65B 2220/14; B65B 2220/16; B65B 2220/18; B65B 2220/24; B65B 2230/02; B65B 2230/04; B65B 23/00; B65B 23/06; B65B 23/08; B65B 23/10; B65B 23/20; B65B 23/22; B65B 25/00; B65B 25/001; B65B 25/005; B65B 25/008; B65B 25/02; B65B 25/023; B65B 25/04; B65B 25/041; B65B 25/046; B65B 25/06; B65B 25/061; B65B 25/065; B65B 25/067; B65B 25/068; B65B 25/12; B65B 25/14; B65B 25/141; B65B 25/145; B65B 25/146; B65B 25/16; B65B 25/22; B65B 27/04; B65B 27/06; B65B 27/08; B65B 27/10; B65B 27/12; B65B 27/125; B65B 29/00; B65B 3/00; B65B 3/003; B65B 3/02; B65B 3/022; B65B 3/025; B65B 3/027; B65B 3/04; B65B 3/045; B65B 3/10; B65B 3/14; B65B 3/22; B65B 3/26; B65B 3/28; B65B 3/30; B65B 3/32; B65B 3/323; B65B 3/34; B65B 31/00; B65B 31/006; B65B 31/02; B65B 31/021; B65B 31/024; B65B 31/025; B65B 31/028; B65B 31/04; B65B 31/042; B65B 31/046; B65B 31/047; B65B 31/08; B65B 35/02; B65B 35/04; B65B 35/10; B65B 35/16; B65B 35/18; B65B 35/205; B65B 35/24; B65B 35/243; B65B 35/30; B65B 35/36; B65B 35/38; B65B 35/40; B65B 35/405; B65B 35/44; B65B 35/46; B65B 35/50; B65B 35/52; B65B 35/54; B65B 35/56; B65B 35/58; B65B 37/00; B65B 37/20; B65B 39/001; B65B 39/006; B65B 39/007; B65B 39/02; B65B 39/04; B65B 39/12; B65B 41/00; B65B 41/02; B65B 41/04; B65B 41/06; B65B 41/12; B65B 41/14; B65B 41/16; B65B 41/18; B65B 43/00; B65B 43/08; B65B 43/10; B65B 43/12; B65B 43/123; B65B 43/126; B65B 43/14; B65B 43/145; B65B 43/165; B65B 43/18; B65B 43/185; B65B 43/205; B65B 43/24; B65B 43/26; B65B 43/265; B65B 43/285; B65B 43/30; B65B 43/305; B65B 43/325; B65B 43/345; B65B 43/39; B65B 43/40; B65B 43/42; B65B 43/44; B65B 43/46; B65B 43/50; B65B 43/52; B65B 43/54; B65B 43/56; B65B 43/60; B65B 47/00; B65B 47/02; B65B 47/04; B65B 47/06; B65B 47/10; B65B 49/00; B65B 49/02;

B65B 49/08; B65B 49/10; B65B 49/12; B65B 49/14; B65B 5/00; B65B 5/02; B65B 5/024; B65B 5/026; B65B 5/028; B65B 5/04; B65B 5/045; B65B 5/06; B65B 5/061; B65B 5/064; B65B 5/065; B65B 5/067; B65B 5/068; B65B 5/08; B65B 5/10; B65D 5/328; B65D 5/5007; B65D 5/5038; B65D 5/5415; B65D 5/542; B65D 5/563; B65D 85/52; B65D 1/00; B65D 1/02; B65D 1/0207; B65D 1/0215; B65D 1/0223; B65D 1/023; B65D 1/0238; B65D 1/0246; B65D 1/0261; B65D 1/0276; B65D 1/0284; B65D 1/0292; B65D 1/04; B65D 1/06; B65D 1/095; B65D 1/10; B65D 1/12; B65D 1/14; B65D 1/165; B65D 1/18; B65D 1/20; B65D 1/22; B65D 1/225; B65D 1/24; B65D 1/243; B65D 1/26; B65D 1/265; B65D 1/28; B65D 1/30; B65D 1/32; B65D 1/34; B65D 1/36; B65D 1/38; B65D 1/40; B65D 1/42; B65D 1/46; B65D 1/48; B65D 11/00; B65D 11/02; B65D 11/04; B65D 11/06; B65D 11/08; B65D 11/10; B65D 11/12; B65D 11/16; B65D 11/18; B65D 11/1826; B65D 11/1833; B65D 11/184; B65D 11/1846; B65D 11/1853; B65D 11/186; B65D 11/1866; B65D 11/1873; B65D 11/1893; B65D 11/20; B65D 11/22; B65D 11/26; B65D 13/00; B65D 13/02; B65D 13/04; B65D 15/00; B65D 15/02; B65D 15/04; B65D 15/06; B65D 15/08; B65D 15/14; B65D 15/18; B65D 15/22; B65D 15/24; B65D 17/00; B65D 17/04; B65D 17/08; B65D 17/28; B65D 17/34; B65D 17/40; B65D 17/401; B65D 17/4011; B65D 17/4012; B65D 17/4014; B65D 17/402; B65D 17/404; B65D 17/462; B65D 17/464; B65D 17/501; B65D 17/502; B65D 17/506; B65D 17/521; B65D 19/00; B65D 19/0002; B65D 19/0004; B65D 19/0006; B65D 19/001; B65D 19/0016; B65D 19/0018; B65D 19/0022; B65D 19/004; B65D 19/0055; B65D 19/0063; B65D 19/0069; B65D 19/0071; B65D 19/0073; B65D 19/0075; B65D 19/0095; B65D 19/0097; B65D 19/02; B65D 19/06; B65D 19/08; B65D 19/10; B65D 19/12; B65D 19/16; B65D 19/18; B65D 19/20; B65D 19/36; B65D 19/38; B65D 19/385; B65D 19/40; B65D 19/42; B65D 19/44; B65D 21/00; B65D 21/02; B65D 21/0201; B65D 21/0204; B65D 21/0205; B65D 21/0206; B65D 21/0209; B65D 21/0211; B65D 21/0212; B65D 21/0213; B65D 21/0215; B65D 21/0217; B65D 21/0219; B65D 21/022; B65D 21/0222; B65D 21/0223; B65D 21/0224; B65D 21/0227; B65D 21/0228; B65D 21/023; B65D 21/0231; B65D 21/0233; B65D 21/0234; B65D 21/0235; B65D 21/045; B65D 21/046; B65D 21/06; B65D 21/062; B65D 21/066; B65D 21/08; B65D 21/083; B65D 21/086; B65D 2201/00; B65D 2203/00; B65D 2203/02; B65D 2203/04; B65D 2203/06; B65D 2203/08; B65D 2203/10; B65D 2203/12; B65D 2205/00; B65D 2205/02; B65D 2205/025; B65D 2207/00; B65D 2209/00; B65D 2211/00; B65D 2213/00; B65D 2215/02; B65D 2215/04; B65D 2215/06; B65D 2215/08; B65D 2217/00; B65D 2217/02; B65D 2221/00; B65D 2231/004; B65D 2231/007; B65D 2231/02; B65D 2231/022; B65D 2251/0009; B65D 2251/0012; B65D 2251/0015; B65D 2251/0018; B65D 2251/0021; B65D 2251/0025; B65D 2251/0028; B65D 2251/0031; B65D 2251/005; B65D 2251/0053; B65D 2251/0056; B65D 2251/0071; B65D 2251/0081; B65D 2251/0087; B65D 2251/009; B65D 2251/0093; B65D 2251/0096; B65D 2251/02; B65D 2251/023; B65D 2251/026; B65D 2251/04; B65D 2251/1008; B65D 2251/1016; B65D 2251/1025; B65D 2251/1033; B65D 2251/1041; B65D 2251/105; B65D 2251/1091; B65D 2251/20; B65D 2251/205; B65D 2255/06; B65D 2255/20; B65D 2275/00; B65D 2275/02; B65D 23/00; B65D 23/001; B65D 23/003; B65D 23/02; B65D 23/04; B65D 23/065; B65D 23/08; B65D 23/0814; B65D 23/085; B65D 23/0857; B65D 23/0864; B65D 23/0878; B65D 23/10; B65D 23/102; B65D 23/104; B65D 23/106; B65D 23/12; B65D 23/14; B65D 2301/10; B65D 2301/20; B65D 2303/00; B65D 2313/00; B65D 2313/02; B65D 2313/04; B65D 2313/08; B65D 2313/10; B65D 2401/00; B65D 2401/10; B65D 2401/15; B65D 2401/25; B65D 2401/30; B65D 2401/35; B65D 2401/50; B65D 2401/55; B65D 2401/60; B65D 25/00; B65D 25/005; B65D 25/02; B65D 25/04; B65D 25/06; B65D 25/08; B65D 25/10; B65D 25/101; B65D 25/102; B65D 25/103; B65D 25/106; B65D 25/107; B65D 25/108; B65D 25/14; B65D 25/16; B65D 25/18; B65D 25/20; B65D 25/205; B65D 25/22; B65D 25/24; B65D 25/28; B65D 25/2808; B65D 25/2835; B65D 25/2867; B65D 25/2873; B65D 25/2882; B65D 25/2885; B65D 25/2897; B65D 25/30; B65D 25/32; B65D 25/34; B65D 25/36; B65D 25/40; B65D 25/42; B65D 25/465; B65D 25/48; B65D 25/52; B65D 25/54; B65D 25/56; B65D 2501/0036; B65D 2501/0045; B65D 2501/0054; B65D 2501/0081; B65D 2501/24324; B65D 2501/24541; B65D 2501/24796; B65D 2501/2484; B65D 2501/24847; B65D 2517/0011; B65D 2517/0013; B65D 2517/0016; B65D 2517/002; B65D 2517/0041; B65D 2517/0043; B65D 2517/0046; B65D 2517/0049; B65D 2517/0052; B65D 2517/0056; B65D 2517/0061; B65D 2517/0062; B65D

2517/0071; B65D 2517/0074; B65D 2517/0082; B65D 2517/0085; B65D 2517/0086; B65D 2517/0092; B65D 2517/0097; B65D 2517/0098; B65D 2517/5029; B65D 2517/5037; B65D 2517/5064; B65D 2517/5083; B65D 2517/5089; B65D 2517/5091; B65D 2519/00019; B65D 2519/00024; B65D 2519/00029; B65D 2519/00034; B65D 2519/00039; B65D 2519/00044; B65D 2519/00054; B65D 2519/00059; B65D 2519/00064; B65D 2519/00069; B65D 2519/00074; B65D 2519/00089; B65D 2519/00094; B65D 2519/00099; B65D 2519/00104; B65D 2519/00109; B65D 2519/00124; B65D 2519/00129; B65D 2519/00134; B65D 2519/00139; B65D 2519/00159; B65D 2519/00164; B65D 2519/00169; B65D 2519/00174; B65D 2519/00184; B65D 2519/00194; B65D 2519/00199; B65D 2519/00203; B65D 2519/00208; B65D 2519/00218; B65D 2519/00228; B65D 2519/00233; B65D 2519/00238; B65D 2519/00243; B65D 2519/00268; B65D 2519/00273; B65D 2519/00278; B65D 2519/00288; B65D 2519/00293; B65D 2519/00298; B65D 2519/00303; B65D 2519/00308; B65D 2519/00318; B65D 2519/00323; B65D 2519/00333; B65D 2519/00338; B65D 2519/00343; B65D 2519/00348; B65D 2519/00353; B65D 2519/00358; B65D 2519/00373; B65D 2519/00388; B65D 2519/00402; B65D 2519/00407; B65D 2519/00412; B65D 2519/00427; B65D 2519/00432; B65D 2519/00437; B65D 2519/00442; B65D 2519/00452; B65D 2519/00497; B65D 2519/00502; B65D 2519/00512; B65D 2519/00527; B65D 2519/00532; B65D 2519/00537; B65D 2519/00557; B65D 2519/00562; B65D 2519/00567; B65D 2519/00572; B65D 2519/00582; B65D 2571/00277; B65D 2571/00283; B65D 2571/0029; B65D 2571/00296; B65D 2571/00302; B65D 2571/00308; B65D 2571/00314; B65D 2571/0032; B65D 2571/00327; B65D 2571/00339; B65D 2571/00351; B65D 2571/00358; B65D 2571/0037; B65D 2571/00382; B65D 2571/00388; B65D 2571/00401; B65D 2571/00407; B65D 2571/00419; B65D 2571/00425; B65D 2571/00438; B65D 2571/00444; B65D 2571/0045; B65D 2571/00456; B65D 2571/00462; B65D 2571/00469; B65D 2571/00475; B65D 2571/00481; B65D 2571/00487; B65D 2571/00493; B65D 2571/00506; B65D 2571/00512; B65D 2571/00524; B65D 2571/0053; B65D 2571/00543; B65D 2571/00549; B65D 2571/00561; B65D 2571/00567; B65D 2571/00574; B65D 2571/0058; B65D 2571/00586; B65D 2571/00592; B65D 2571/00604; B65D 2571/00629; B65D 2571/00635; B65D 2571/0066; B65D 2571/00666; B65D 2571/00672; B65D 2571/00697; B65D 2571/00716; B65D 2571/00722; B65D 2571/00728; B65D 2571/00746; B65D 2571/00753; B65D 2571/00759; B65D 2571/00765; B65D 2571/00783; B65D 2571/0079; B65D 2571/00796; B65D 2571/00802; B65D 2571/00808; B65D 2571/00814; B65D 2571/0082; B65D 2571/00833; B65D 2571/00839; B65D 2571/00845; B65D 2571/00851; B65D 2571/00858; B65D 2571/00864; B65D 2571/0087; B65D 2571/00876; B65D 2571/00882; B65D 2571/00895; B65D 2571/00907; B65D 2571/00913; B65D 2571/00919; B65D 2571/00925; B65D 2571/00932; B65D 2571/00938; B65D 2571/00956; B65D 2571/00962; B65D 2571/00969; B65D 2571/00975; B65D 2571/00981; B65D 2571/00987; B65D 2571/00993; B65D 2575/3218; B65D 2575/3227; B65D 2575/3236; B65D 2575/3245; B65D 2575/3254; B65D 2575/362; B65D 2575/363; B65D 2575/365; B65D 2575/366; B65D 2575/367; B65D 2575/368; B65D 2575/565; B65D 2575/58; B65D 2575/583; B65D 2575/586; B65D 2577/00; B65D 2577/042; B65D 2577/043; B65D 2577/045; B65D 2577/048; B65D 2577/2025; B65D 2577/205; B65D 2577/2058; B65D 2577/2066; B65D 2577/2083; B65D 2577/2091; B65D 2581/051; B65D 2581/053; B65D 2581/055; B65D 2581/056; B65D 2581/3404; B65D 2581/3405; B65D 2581/3406; B65D 2581/3408; B65D 2581/341; B65D 2581/3412; B65D 2581/3413; B65D 2581/3418; B65D 2581/3421; B65D 2581/3422; B65D 2581/3425; B65D 2581/3428; B65D 2581/3429; B65D 2581/3432; B65D 2581/3433; B65D 2581/3435; B65D 2581/3437; B65D 2581/344; B65D 2581/3441; B65D 2581/3444; B65D 2581/3445; B65D 2581/3447; B65D 2581/3456; B65D 2581/346; B65D 2581/3466; B65D 2581/3471; B65D 2581/3472; B65D 2581/3474; B65D 2581/3477; B65D 2581/3478; B65D 2581/3479; B65D 2581/3483; B65D 2581/3489; B65D 2581/3494; B65D 2581/3495; B65D 2581/3498; B65D 2583/005; B65D 2583/0454; B65D 2583/0459; B65D 2583/0468; B65D 2583/0481; B65D 2585/085; B65D 2585/36; B65D 2585/363; B65D 2585/366; B65D 2585/545; B65D 2585/56; B65D 2585/648; B65D 2585/6815; B65D 2585/6817; B65D 2585/6835; B65D 2585/6837; B65D 2585/842; B65D 2585/686; B65D 2585/6862; B65D 2585/6865; B65D 2585/6867; B65D 2585/6877; B65D 2585/6882; B65D 2585/6885; B65D

2585/6892; B65D 2585/88; B65D
2588/165; B65D 2590/066; B65D
2590/046; B65D 2590/548; B65D
2590/666; B65D 27/00; B65D 27/005;
B65D 27/04; B65D 27/06; B65D 27/14;
B65D 27/16; B65D 27/20; B65D 27/28;
B65D 27/34; B65D 3/00; B65D 3/02;
B65D 3/04; B65D 3/06; B65D 3/08;
B65D 3/10; B65D 3/12; B65D 3/14;
B65D 3/18; B65D 3/20; B65D 3/22;
B65D 3/26; B65D 3/261; B65D 3/262;
B65D 3/263; B65D 3/264; B65D 3/265;
B65D 3/266; B65D 3/267; B65D 3/268;
B65D 3/28; B65D 3/30; B65D 31/00;
B65D 31/005; B65D 31/02; B65D 31/04;
B65D 31/08; B65D 31/10; B65D 31/12;
B65D 31/14; B65D 31/145; B65D 31/16;
B65D 31/18; B65D 33/00; B65D 33/001;
B65D 33/004; B65D 33/007; B65D
33/008; B65D 33/01; B65D 33/02; B65D
33/04; B65D 33/06; B65D 33/065; B65D
33/08; B65D 33/10; B65D 33/105; B65D
33/12; B65D 33/14; B65D 33/16; B65D
33/1616; B65D 33/165; B65D 33/1658;
B65D 33/1666; B65D 33/1675; B65D
33/1683; B65D 33/1691; B65D 33/18;
B65D 33/20; B65D 33/22; B65D 33/24;
B65D 33/243; B65D 33/25; B65D
33/2508; B65D 33/2516; B65D 33/2525;
B65D 33/2533; B65D 33/2541; B65D
33/255; B65D 33/2583; B65D 33/2589;
B65D 33/259; B65D 33/28; B65D 33/30;
B65D 33/34; B65D 35/02; B65D 35/04;
B65D 35/08; B65D 35/10; B65D 35/22;
B65D 35/24; B65D 35/28; B65D 35/285;
B65D 35/30; B65D 35/38; B65D 35/42;
B65D 37/00; B65D 39/00; B65D
39/0011; B65D 39/0058; B65D 39/0076;
B65D 39/04; B65D 39/084; B65D
39/088; B65D 39/10; B65D 39/16; B65D
41/00; B65D 41/02; B65D 41/04; B65D
41/0414; B65D 41/045; B65D 41/0471;
B65D 41/0485; B65D 41/0492; B65D
41/12; B65D 41/16; B65D 41/17; B65D
41/18; B65D 41/185; B65D 41/20; B65D
41/26; B65D 41/265; B65D 41/28; B65D
41/32; B65D 41/325; B65D 41/34; B65D
41/3404; B65D 41/3428; B65D 41/3442;
B65D 41/3447; B65D 41/3452; B65D
41/3485; B65D 41/365; B65D 41/38;
B65D 41/42; B65D 41/46; B65D 41/48;
B65D 41/485; B65D 41/58; B65D 43/02;
B65D 43/0202; B65D 43/0204; B65D
43/0208; B65D 43/021; B65D 43/0212;
B65D 43/0216; B65D 43/0218; B65D
43/022; B65D 43/0222; B65D 43/0225;
B65D 43/0229; B65D 43/0231; B65D
43/0233; B65D 43/0235; B65D 43/0237;
B65D 43/0241; B65D 43/0247; B65D
43/0252; B65D 43/0254; B65D 43/0256;
B65D 43/0258; B65D 43/0262; B65D
43/0266; B65D 43/0268; B65D 43/027;
B65D 43/0274; B65D 43/0293; B65D
43/065; B65D 43/12; B65D 43/14; B65D
43/16; B65D 43/161; B65D 43/162;
B65D 43/163; B65D 43/164; B65D
43/166; B65D 43/168; B65D 43/169;
B65D 43/20; B65D 43/22; B65D 45/16;
B65D 45/18; B65D 45/20; B65D 45/24;
B65D 45/327; B65D 45/34; B65D 47/00;
B65D 47/06; B65D 47/061; B65D
47/063; B65D 47/065; B65D 47/0804;
B65D 47/0809; B65D 47/0814; B65D
47/0833; B65D 47/0838; B65D 47/0842;
B65D 47/0895; B65D 47/10; B65D
47/103; B65D 47/106; B65D 47/12;
B65D 47/121; B65D 47/122; B65D
47/123; B65D 47/14; B65D 47/142;
B65D 47/148; B65D 47/20; B65D
47/2025; B65D 47/2031; B65D 47/2037;
B65D 47/2062; B65D 47/242; B65D
47/243; B65D 47/247; B65D 47/263;
B65D 47/265; B65D 47/30; B65D
47/305; B65D 47/32; B65D 47/36; B65D
47/40; B65D 47/42; B65D 49/04; B65D
49/12; B65D 5/00; B65D 5/0005; B65D
5/001; B65D 5/0015; B65D 5/002; B65D
5/0025; B65D 5/003; B65D 5/0035;
B65D 5/0045; B65D 5/0055; B65D
5/006; B65D 5/0075; B65D 5/008; B65D
5/0085; B65D 5/009; B65D 5/0095;
B65D 5/02; B65D 5/0209; B65D 5/0218;
B65D 5/0227; B65D 5/0236; B65D
5/0245; B65D 5/0254; B65D 5/0263;
B65D 5/0272; B65D 5/0281; B65D
5/029; B65D 5/04; B65D 5/06; B65D
5/061; B65D 5/062; B65D 5/064; B65D
5/065; B65D 5/067; B65D 5/068; B65D
5/069; B65D 5/08; B65D 5/10; B65D
5/103; B65D 5/106; B65D 5/12; B65D
5/14; B65D 5/16; B65D 5/18; B65D
5/20; B65D 5/2004; B65D 5/2009; B65D
5/2014; B65D 5/2019; B65D 5/2028;
B65D 5/2033; B65D 5/2038; B65D
5/2042; B65D 5/2047; B65D 5/2052;
B65D 5/2057; B65D 5/2076; B65D
5/208; B65D 5/2085; B65D 5/209; B65D
5/22; B65D 5/24; B65D 5/241; B65D
5/243; B65D 5/244; B65D 5/247; B65D
5/248; B65D 5/26; B65D 5/28; B65D
5/301; B65D 5/302; B65D 5/307; B65D
5/308; B65D 5/32; B65D 5/321; B65D
5/322; B65D 5/323; B65D 5/324; B65D
5/325; B65D 5/326; B65D 5/36; B65D
5/3607; B65D 5/3614; B65D 5/3621;
B65D 5/3628; B65D 5/3636; B65D
5/3642; B65D 5/3687; B65D 5/3685;
B65D 5/38; B65D 5/40; B65D 5/42;
B65D 5/4204; B65D 5/42808; B65D
5/4212; B65D 5/4216; B65D 5/422;
B65D 5/4225; B65D 5/4229; B65D
5/4233; B65D 5/4237; B65D 5/4245;
B65D 5/425; B65D 5/4254; B65D
5/4266; B65D 5/4275; B65D 5/4279;
B65D 5/4283; B65D 5/4287; B65D
5/4291; B65D 5/4295; B65D 5/44; B65D
5/441; B65D 5/443; B65D 5/445; B65D
5/446; B65D 5/46; B65D 5/46008; B65D
5/46016; B65D 5/46024; B65D 5/46032;
B65D 5/4604; B65D 5/46056; B65D

5/46072; B65D 5/4608; B65D 5/46088; B65D 5/46096; B65D 5/46112; B65D 5/4612; B65D 5/46128; B65D 5/46184; B65D 5/46192; B65D 5/48; B65D 5/48002; B65D 5/48004; B65D 5/48014; B65D 5/48016; B65D 5/48018; B65D 5/4802; B65D 5/48022; B65D 5/48024; B65D 5/48026; B65D 5/48032; B65D 5/48036; B65D 5/48038; B65D 5/4804; B65D 5/48042; B65D 5/48044; B65D 5/48046; B65D 5/48048; B65D 5/50; B65D 5/5002; B65D 5/5004; B65D 5/0059; B65D 5/5011; B65D 5/5014; B65D 5/5016; B65D 5/5019; B65D 5/5021; B65D 5/5023; B65D 5/5026; B65D 5/5028; B65D 5/503; B65D 5/5033; B65D 5/5035; B65D 5/504; B65D 5/5045; B65D 5/505; B65D 5/5052; B65D 5/5054; B65D 5/5057; B65D 5/5059; B65D 5/5061; B65D 5/5066; B65D 5/5069; B65D 5/5073; B65D 5/5085; B65D 5/5088; B65D 5/509; B65D 5/5097; B65D 5/52; B65D 5/5206; B65D 5/5213; B65D 5/522; B65D 5/5233; B65D 5/524; B65D 5/5246; B65D 5/5253; B65D 5/5266; B65D 5/5273; B65D 5/5286; B65D 5/54; B65D 5/5405; B65D 5/541; B65D 5/5425; B65D 5/543; B65D 5/5435; B65D 5/544; B65D 5/5445; B65D 5/545; B65D 5/5455; B65D 5/546; B65D 5/547; B65D 5/5475; B65D 5/548; B65D 5/5485; B65D 5/5495; B65D 5/56; B65D 5/566; B65D 5/58; B65D 5/60; B65D 5/603; B65D 5/606; B65D 5/62; B65D 5/64; B65D 5/643; B65D 5/66; B65D 5/6602; B65D 5/6605; B65D 5/6608; B65D 5/6611; B65D 5/662; B65D 5/6623; B65D 5/6626; B65D 5/6629; B65D 5/6632; B65D 5/6644; B65D 5/665; B65D 5/6652; B65D 5/6655; B65D 5/6658; B65D 5/6661; B65D 5/6664; B65D 5/6667; B65D 5/667; B65D 5/6673; B65D 5/6685; B65D 5/6691; B65D 5/6697; B65D 5/68; B65D 5/685; B65D 5/70; B65D 5/701; B65D 5/703; B65D 5/705; B65D 5/706; B65D 5/708; B65D 5/72; B65D 5/721; B65D 5/722; B65D 5/723; B65D 5/724; B65D 5/725; B65D 5/726; B65D 5/727; B65D 5/728; B65D 5/74; B65D 5/741; B65D 5/742; B65D 5/744; B65D 5/745; B65D 5/746; B65D 5/747; B65D 5/748; B65D 5/749; B65D 5/76; B65D 50/00; B65D 50/04; B65D 50/041; B65D 50/043; B65D 50/045; B65D 50/046; B65D 50/06; B65D 50/061; B65D 51/00; B65D 51/002; B65D 51/007; B65D 51/16; B65D 51/1611; B65D 51/1616; B65D 51/1627; B65D 51/1644; B65D 51/1666; B65D 51/1677; B65D 51/1688; B65D 51/1694; B65D 51/18; B65D 51/185; B65D 51/20; B65D 51/22; B65D 51/222; B65D 51/224; B65D 51/225; B65D 51/228; B65D 51/24; B65D 51/242; B65D 51/244; B65D 51/245; B65D 51/246; B65D 51/247; B65D 51/248; B65D 51/249; B65D 51/26; B65D 51/28; B65D 51/2807; B65D 51/2814; B65D 51/2821; B65D 51/2828; B65D 51/2835; B65D 51/2842; B65D 51/285; B65D 51/2864; B65D 51/2871; B65D 51/2878; B65D 51/2885; B65D 51/2892; B65D 51/30; B65D 51/32; B65D 53/00; B65D 53/02; B65D 53/04; B65D 53/08; B65D 55/00; B65D 55/02; B65D 55/024; B65D 55/026; B65D 55/028; B65D 55/06; B65D 55/0818; B65D 55/0854; B65D 55/0863; B65D 55/0872; B65D 55/0881; B65D 55/16; B65D 57/003; B65D 59/02; B65D 59/04; B65D 59/06; B65D 59/08; B65D 61/00; B65D 63/10; B65D 63/1009; B65D 63/1018; B65D 63/1027; B65D 63/109; B65D 63/14; B65D 63/16; B65D 63/18; B65D 65/00; B65D 65/02; B65D 65/04; B65D 65/08; B65D 65/10; B65D 65/12; B65D 65/14; B65D 65/18; B65D 65/20; B65D 65/22; B65D 65/24; B65D 65/38; B65D 65/40; B65D 65/403; B65D 65/406; B65D 65/42; B65D 65/44; B65D 65/46; B65D 65/463; B65D 65/466; B65D 67/00; B65D 67/02; B65D 69/00; B65D 7/00; B65D 7/045; B65D 7/06; B65D 7/08; B65D 7/12; B65D 7/14; B65D 7/20; B65D 7/22; B65D 7/24; B65D 7/26; B65D 7/30; B65D 7/32; B65D 7/38; B65D 7/42; B65D 7/44; B65D 7/46; B65D 71/00; B65D 71/0003; B65D 71/0014; B65D 71/0022; B65D 71/0025; B65D 71/0029; B65D 71/0033; B65D 71/0037; B65D 71/004; B65D 71/0048; B65D 71/0051; B65D 71/0055; B65D 71/0066; B65D 71/007; B65D 71/0077; B65D 71/0085; B65D 71/0088; B65D 71/0092; B65D 71/0096; B65D 71/02; B65D 71/04; B65D 71/06; B65D 71/063; B65D 71/066; B65D 71/08; B65D 71/10; B65D 71/12; B65D 71/125; B65D 71/14; B65D 71/16; B65D 71/18; B65D 71/20; B65D 71/22; B65D 71/24; B65D 71/243; B65D 71/26; B65D 71/28; B65D 71/285; B65D 71/30; B65D 71/32; B65D 71/34; B65D 71/36; B65D 71/38; B65D 71/40; B65D 71/403; B65D 71/42; B65D 71/44; B65D 71/46; B65D 71/48; B65D 71/50; B65D 71/502; B65D 71/504; B65D 71/506; B65D 71/508; B65D 71/70; B65D 71/72; B65D 73/00; B65D 73/0007; B65D 73/0014; B65D 73/0021; B65D 73/0028; B65D 73/0035; B65D 73/0042; B65D 73/005; B65D 73/0057; B65D 73/0064; B65D 73/0071; B65D 73/0078; B65D 73/0085; B65D 73/0092; B65D 73/02; B65D 75/00; B65D 75/002; B65D 75/004; B65D 75/006; B65D 75/008; B65D 75/02; B65D 75/04; B65D 75/08; B65D 75/12; B65D 75/14; B65D 75/18; B65D 75/20; B65D 75/22; B65D 75/225; B65D 75/24; B65D 75/245; B65D 75/26; B65D 75/28;

B65D 75/30; B65D 75/305; B65D 75/32;
B65D 75/321; B65D 75/322; B65D
75/323; B65D 75/324; B65D 75/326;
B65D 75/327; B65D 75/328; B65D
76/36; B65D 75/366; B65D 75/367;
B65D 75/368; B65D 75/38; B65D 75/42;
B65D 75/44; B65D 75/48; B65D 75/50;
B65D 75/52; B65D 75/522; B65D
75/525; B65D 75/527; B65D 75/54;
B65D 75/545; B65D 75/56; B65D
75/563; B65D 75/566; B65D 75/58;
B65D 75/5805; B65D 75/5811; B65D
75/5816; B65D 75/5822; B65D 75/5827;
B65D 75/5833; B65D 75/5838; B65D
75/5844; B65D 75/585; B65D 75/5855;
B65D 75/5861; B65D 75/5866; B65D
75/5872; B65D 75/5877; B65D 75/5883;
B65D 75/5888; B65D 75/5894; B65D
75/66; B65D 75/68; B65D 75/70; B65D
77/00; B65D 77/003; B65D 77/006;
B65D 77/02; B65D 77/04; B65D
77/0406; B65D 77/0413; B65D 77/042;
B65D 77/0426; B65D 77/0433; B65D
77/044; B65D 77/0446; B65D 77/0453;
B65D 77/046; B65D 77/0466; B65D
77/0473; B65D 77/0486; B65D 77/0493;
B65D 77/06; B65D 77/061; B65D
77/062; B65D 77/064; B65D 77/065;
B65D 77/067; B65D 77/068; B65D
77/08; B65D 77/10; B65D 77/12; B65D
77/14; B65D 77/20; B65D 77/2004;
B65D 77/2008; B65D 77/2012; B65D
77/2016; B65D 77/2024; B65D 77/2032;
B65D 77/204; B65D 77/2052; B65D
77/2056; B65D 77/2068; B65D 77/208;
B65D 77/2088; B65D 77/2092; B65D
77/22; B65D 77/225; B65D 77/24; B65D
77/245; B65D 77/26; B65D 77/28; B65D
77/283; B65D 77/286; B65D 77/30;
B65D 77/32; B65D 77/36; B65D 77/38;
B65D 79/0087; B65D 79/02; B65D
81/00; B65D 81/02; B65D 81/022; B65D
81/027; B65D 81/03; B65D 81/05; B65D
81/051; B65D 81/052; B65D 81/054;
B65D 81/055; B65D 81/056; B65D
81/057; B65D 81/058; B65D 81/07;
B65D 81/075; B65D 81/09; B65D
81/107; B65D 81/1075; B65D 81/113;
B65D 81/1275; B65D 81/133; B65D
81/18; B65D 81/20; B65D 81/2007;
B65D 81/2015; B65D 81/2023; B65D
81/203; B65D 81/2038; B65D 81/2046;
B65D 81/2061; B65D 81/2069; B65D
81/2076; B65D 81/2084; B65D 81/2092;
B65D 81/22; B65D 81/24; B65D 81/26;
B65D 81/261; B65D 81/262; B65D
81/263; B65D 81/264; B65D 81/265;
B65D 81/266; B65D 81/267; B65D
81/268; B65D 81/28; B65D 81/30; B65D
81/32; B65D 81/3205; B65D 81/3211;
B65D 81/3216; B65D 81/3222; B65D
81/3227; B65D 81/3233; B65D 81/3238;
B65D 81/3261; B65D 81/3266; B65D
81/3288; B65D 81/3294; B65D 81/34;
B65D 81/3415; B65D 81/343; B65D
81/3438; B65D 81/3446; B65D 81/3453;
B65D 81/3461; B65D 81/3469; B65D
81/3476; B65D 81/3484; B65D 81/36;
B65D 81/361; B65D 81/363; B65D
81/365; B65D 81/368; B65D 81/38;
B65D 81/3804; B65D 81/3806; B65D
81/3811; B65D 81/3813; B65D 81/3816;
B65D 81/3818; B65D 81/382; B65D
81/3823; B65D 81/3827; B65D 81/383;
B65D 81/3834; B65D 81/3853; B65D
81/3858; B65D 81/386; B65D 81/3862;
B65D 81/3865; B65D 81/3869; B65D
81/3874; B65D 81/3876; B65D 81/3883;
B65D 81/3888; B65D 81/3893; B65D
81/3897; B65D 83/00; B65D 83/0088;
B65D 83/0094; B65D 83/02; B65D
83/04; B65D 83/0409; B65D 83/0427;
B65D 83/0445; B65D 83/0454; B65D
83/0463; B65D 83/0472; B65D 83/0481;
B65D 83/06; B65D 83/08; B65D
83/0805; B65D 83/0817; B65D 83/0835;
B65D 83/0841; B65D 83/0847; B65D
83/0852; B65D 83/0858; B65D 83/0864;
B65D 83/0876; B65D 83/0894; B65D
83/10; B65D 83/12; B65D 83/20; B65D
83/226; B65D 83/345; B65D 83/62;
B65D 83/685; B65D 83/74; B65D 83/76;
B65D 83/763; B65D 83/766; B65D
83/768; B65D 83/771; B65D 83/7711;
B65D 83/7713; B65D 83/7714; B65D
83/775; B65D 85/00; B65D 85/02; B65D
85/04; B65D 85/07; B65D 85/08; B65D
85/10; B65D 85/1009; B65D 85/1018;
B65D 85/1027; B65D 85/1036; B65D
85/1045; B65D 85/1048; B65D 85/10484;
B65D 85/1054; B65D 85/1056; B65D
85/10564; B65D 85/10568; B65D
85/1063; B65D 85/1072; B65D 85/1081;
B65D 85/109; B65D 85/14; B65D 85/18;
B65D 85/185; B65D 85/187; B65D
85/20; B65D 85/26; B65D 85/30; B65D
85/305; B65D 85/32; B65D 85/322;
B65D 85/324; B65D 85/325; B65D
85/34; B65D 85/345; B65D 85/36; B65D
85/38; B65D 85/42; B65D 85/44; B65D
85/46; B65D 85/48; B65D 85/50; B65D
85/505; B65D 85/54; B65D 85/542;
B65D 85/544; B65D 85/548; B65D
85/58; B65D 85/60; B65D 85/62; B65D
85/64; B65D 85/66; B65D 85/67; B65D
85/671; B65D 85/672; B65D 85/676;
B65D 85/68; B65D 85/70; B65D 85/72;
B65D 85/74; B65D 85/76; B65D 85/78;
B65D 85/80; B65D 85/804; B65D
85/8043; B65D 85/8046; B65D 85/8049;
B65D 85/8052; B65D 85/8055; B65D
85/8061; B65D 85/8067; B65D 85/808;
B65D 85/8085; B65D 85/812; B65D
85/816; B65D 85/82; B65D 85/84; B65D
88/00; B65D 88/005; B65D 88/02; B65D
88/022; B65D 88/10; B65D 88/12; B65D
88/121; B65D 88/123; B65D 88/128;
B65D 88/129; B65D 88/1606; B65D
88/1612; B65D 88/1618; B65D 88/1637;
B65D 88/1668; B65D 88/1675; B65D

88/1687; B65D 88/22; B65D 88/28; B65D 88/32; B65D 88/522; B65D 88/528; B65D 88/54; B65D 88/56; B65D 88/74; B65D 88/741; B65D 88/745; B65D 9/02; B65D 9/06; B65D 9/10; B65D 9/12; B65D 9/22; B65D 9/24; B65D 9/30; B65D 9/34; B65D 90/00; B65D 9/0013; B65D 90/0033; B65D 90/004; B65D 90/0053; B65D 90/006; B65D 90/0066; B65D 90/0073; B65D 90/008; B65D 90/0086; B65D 90/02; B65D 90/022; B65D 90/04; B65D 90/043; B65D 90/046; B65D 90/047; B65D 90/048; B65D 90/06; B65D 90/08; B65D 90/12; B65D 90/18; B65D 90/24; B65D 90/325; B65D 90/34; B65D 90/48; B65D 90/52; B65D 90/54; B65D 90/582; B65D 90/587; B65D 90/623; B65D 90/626

USPC .................................. 206/423; 229/117.27
See application file for complete search history.

(56) References Cited

U.S. PATENT DOCUMENTS

| | | | |
|---|---|---|---|
| 5,029,708 A * | 7/1991 | Alonso | B65D 85/52 |
| | | | 47/84 |
| 5,038,930 A * | 8/1991 | Holtkamp, Jr. | B65D 5/5007 |
| | | | 229/115 |
| 5,427,240 A | 6/1995 | Holtkamp, Jr. | |
| 6,745,514 B1 * | 6/2004 | Myrland | A01G 9/026 |
| | | | 47/84 |
| 2019/0315565 A1 | 10/2019 | Mast | |

FOREIGN PATENT DOCUMENTS

| | | | | |
|---|---|---|---|---|
| FR | 2816916 A1 * | 5/2002 | ............... | B65D 5/08 |
| JP | 2004051141 A * | 2/2004 | | |
| KR | 20100138021 A * | 12/2010 | ........... | B65D 5/4266 |
| KR | 20130002895 U * | 5/2013 | ............. | B65D 85/52 |
| KR | 20130121298 * | 11/2013 | ............. | B65D 85/52 |
| KR | 20130121298 A * | 11/2013 | ............. | B65D 85/52 |
| NL | 2012153 C2 * | 7/2015 | ............. | B65D 5/542 |

* cited by examiner

PACKAGING CONTAINERS AND ASSOCIATED SYSTEMS AND PACKAGING METHODS

FIELD

The present patent application relates to product packaging and shipping containers, and, more particularly, to packaging containers configured to transport products, such as potted plants and the like.

BACKGROUND

With the advent of ecommerce, consumers have grown accustomed to purchasing various products over the internet or by other electronic means (e.g., email, facsimile or the like). A wide variety of products now move through ecommerce, including various live plant products (e.g., potted plants, well-rooted plants, hanging basket plants, and the like). Such products are typically shipped, whether by the United States Postal Service or by private courier, directly to consumers.

Manufacturers and distributors engaged in ecommerce continue to look for ways to improve packaging and shipping efficiency, as well as to reduce overall costs. Parcels (e.g., corrugated boxes) are attractive options for shipping consumer goods because they are durable, they can contain relatively large volumes, and they are relatively easy to load using an automated process (e.g., a pick-and-place robot). However, relatively speaking, current parcels are not configured to safely transport live plants. Issues with current parcels include plants turning upside down during transit, plants losing soil during transit, water leaking and damaging the parcel, plants jostling against the parcel walls during transit, and difficulties removing the plants from the parcels without damaging the plant.

Accordingly, those skilled in the art continue with research and development efforts in the field of product packaging and shipping.

SUMMARY

Disclosed are packaging containers, systems, and methods related to packaging containers.

In one example, the disclosed packaging container includes a plurality of sidewall panels that define an internal volume. The plurality of sidewall panels may include at least a first sidewall panel and a second sidewall panel connected to the first sidewall panel along a predefined corner fold line. The packaging container may further include a push-in feature located on the predefined corner fold line. The push-in feature is movable between at least a first configuration and a second configuration. A tear-away piece may be located on at least one sidewall panel of the plurality of sidewall panels. In one implementation, the packaging container may include a top wall defined by a plurality of top panels. In another implementation, the packaging container may include a bottom wall defined by a plurality of bottom panels. In yet another implementation, the packaging container includes an insert.

In one example, the disclosed system includes a packaging container having a plurality of sidewall panels that define an internal volume. The plurality of sidewall panels may include at least a first sidewall panel and a second sidewall panel connected to the first sidewall panel along a predefined corner fold line. The packaging container may further include a push-in feature located on the predefined corner fold line. The push-in feature may be movable between at least a first configuration and a second configuration. A tear-away piece may be located on at least one sidewall panel of the plurality of sidewall panels. In an example, the system includes a potted plant located in the internal volume of the packaging container. In an example, the system includes an insert located in a bottom portion of the packaging container.

In one example, the disclosed method for packaging a product for shipping includes assembling a packaging container, loading a product into the packaging container, and moving (e.g., pushing in) a predefined line of the packaging container to form a push-in feature. In an example, the method includes adhering a top wall to at the packaging container. In an example, the method includes adhering a bottom wall to at the packaging container. In an example, the method includes loading an insert into the packaging container. In an example, the product is a potted plant.

DETAILED DESCRIPTION

Figure 1:
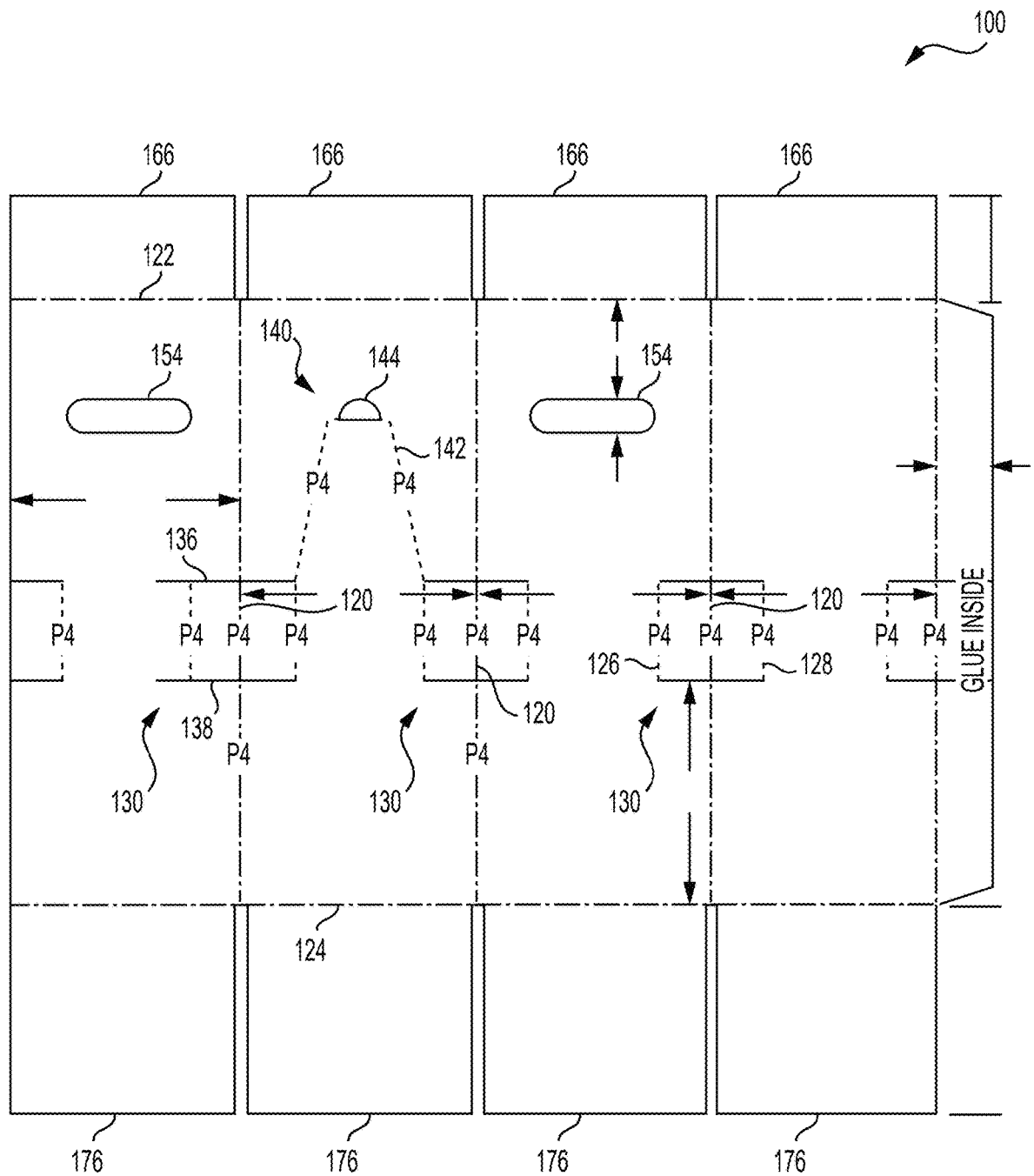
FIG. 1 is a plan view of one example of an unassembled packaging container.
Figure 2:
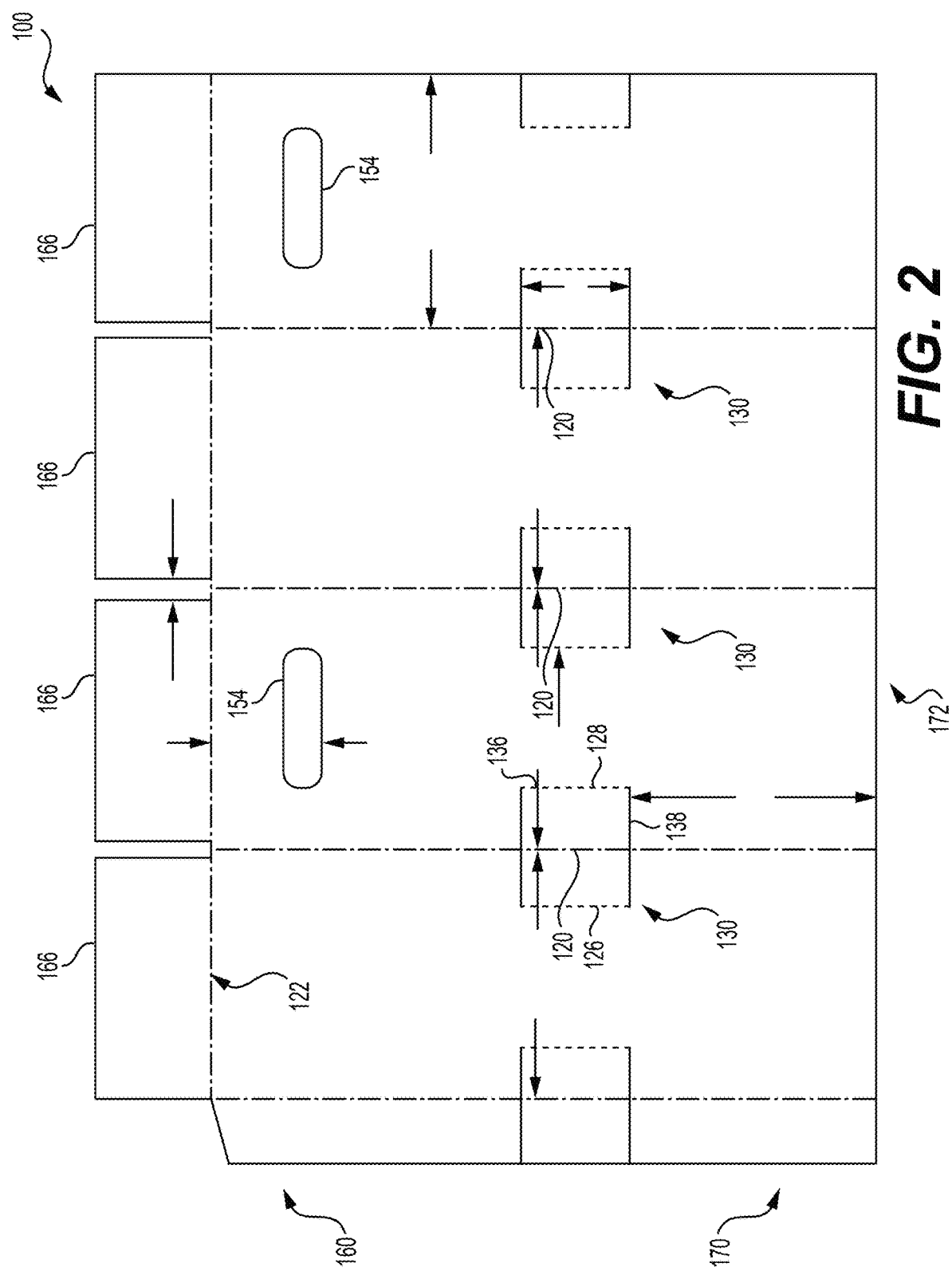
FIG. 2 is a plan view of another example of an unassembled packaging container.
Figure 3:
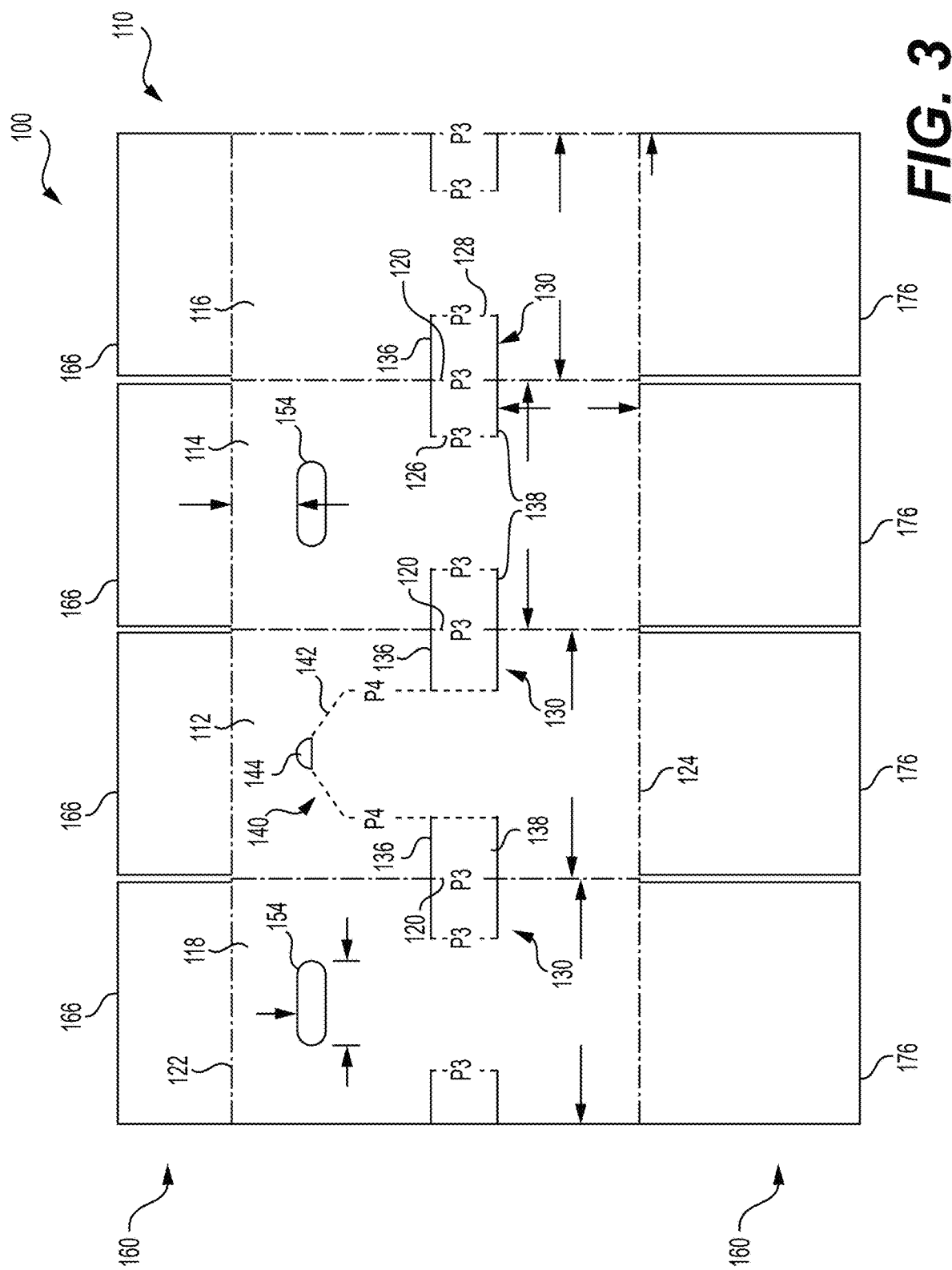
FIG. 3 is a plan view of another example of an unassembled packaging container.
Figure 4:
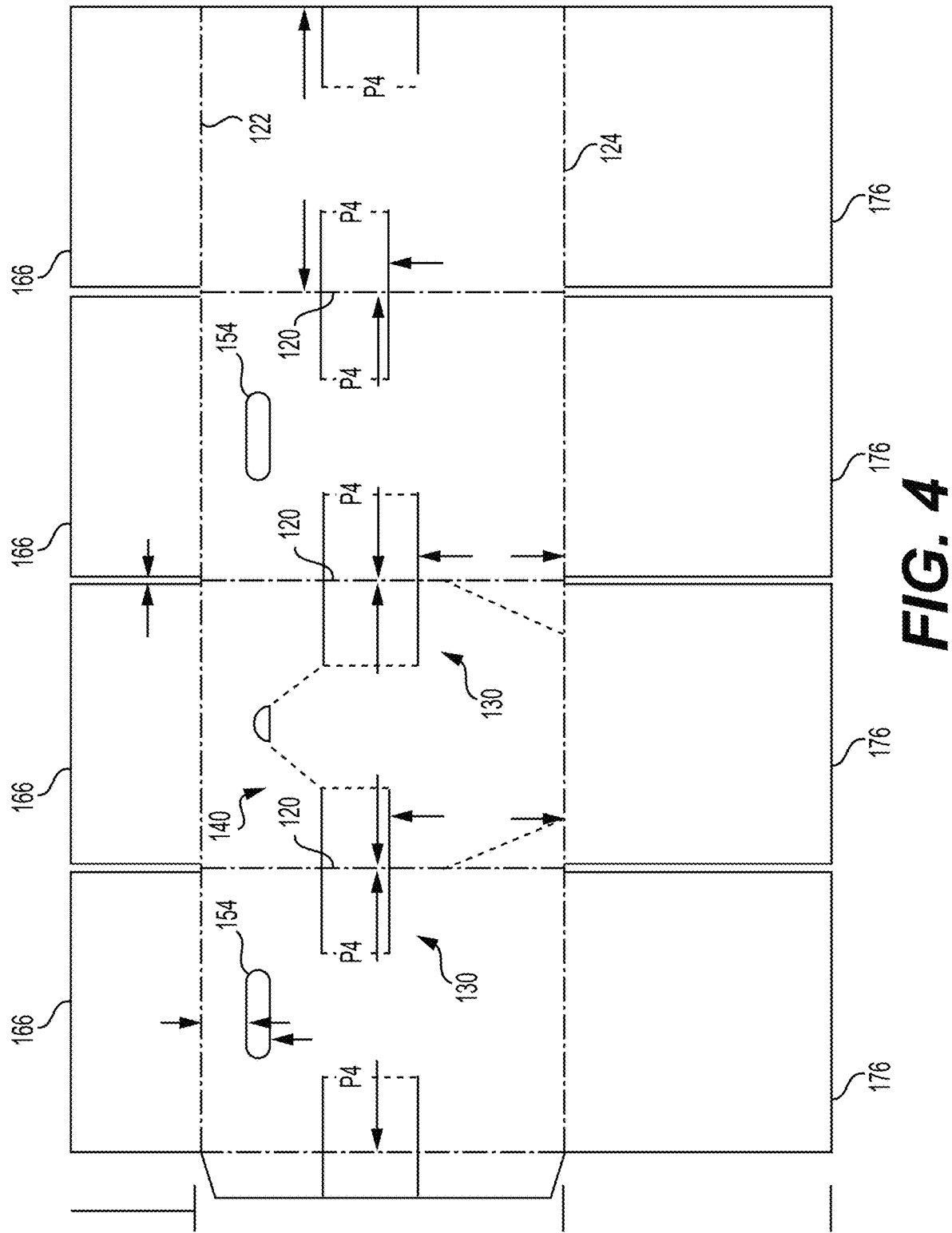
FIG. 4 is a plan view of another example of an unassembled packaging container.

Disclosed are packaging containers as well as systems and methods related to packaging containers. Specifically, the disclosed packaging containers are configured to house live potted plants such that the plants are not damaged during transport.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

As used herein, the terms "about," "approximately," and "generally" refer to or represent a condition that is close to, but not exactly, the stated condition that still performs the desired function or achieves the desired result. As an example, the terms "about," "approximately," and "generally" refer to a condition that is within an acceptable predetermined tolerance or accuracy. For example, the terms "about," "approximately," and "generally" refer to a condition that is within 10% of the stated condition. However, the terms "about," "approximately," and "generally" do not exclude a condition that is exactly the stated condition.

FIGS. 1-15 illustrate exemplary embodiments of a packaging container 100 and features thereof in both assembled and unassembled configurations. In an example, packaging container 100 may be comprised of corrugated paperboard, cardboard, or any suitable material for safely transporting a product 152. In an example, packaging container 100 includes a plurality of (e.g., four) sidewall panels 110 that are configured to define an internal volume 150. Internal volume 150 may be configured to house a product 152 for transport. Product 152 may be a potted plant 190.

The plurality of sidewall panels 110 may include a first sidewall panel 112 and a second sidewall panel 114. The first sidewall panel 112 and second sidewall panel 114 may be generally rectangular, generally triangular, or any other geometric shape, whether regular or irregular, based upon the number of sidewall panels 110. In an example, first sidewall panel 112 and second sidewall panel 114 are generally adjacent to each other and connected via a predefined corner fold line 120. Predefined corner fold line 120 may be a crease, perforation, cut, or any other means suitable to create a weakness such that the packaging container 100 may buckle along the predefined corner fold line 120. Predefined corner fold line 120 may extend longitudinally from a top portion 160 of the packaging container 100 to a bottom portion 170 of the packaging container 100. Predefined corner fold line 120 may be configured to buckle while maintaining structural integrity at various angles. In an example, the predefined corner fold line 120 may buckle such that first sidewall panel 112 and second sidewall panel 114 form about a 90-degree angle. In an example, the predefined corner fold line 120 may buckle such that the first sidewall panel 112 and the second sidewall panel 114 form about a 33-degree angle.

In an example, a push-in feature 130 is located on the predefined corner fold line 120. The push-in feature 130 may be located near the bottom portion 170 of the packaging container 100. Push-in feature 130 may be defined by various creases, cuts, perforations, and the like on packaging container 100 such that the push-in feature 130 may be configured to have a rectangular shape. In an example, push-in feature 130 may have a generally triangular shape. It is also contemplated that push-in feature may be of any other geometrical shape, both regular and irregular, based upon the orientation of the various creases, cuts, perforations, and the like on the packaging container 100 as well as the number of sidewall panels 110.

In an example, push-in feature 130 may be defined by at least a first horizontal cut 136 and a second horizontal cut 138 that are parallel to each other and are perpendicular to the predefined corner fold line 120. First horizontal cut 136 and second horizontal cut 138 may extend across the first sidewall panel 112 and the second sidewall panel 114 in generally equal portions. In an example, push-in feature 130 is further defined by a first push-in fold line 126 and a second push-in fold line 128 that are parallel to and equally spaced from the predefined corner fold line 120 centered between the first push-in fold line 126 and second push-in fold line 128. First push-in fold line 126 and second push-in fold line 128 may extend between the first horizontal cut 136 and the second horizontal cut 138. First push-in fold line 126 and second push-in fold line 128 may be creases, cuts, perforations, or any other means suitable for creating a weakness along each respective fold line. Together, the combination of first push-in fold line 126, second push-in fold line 128, first horizontal cut 136, second horizontal cut 138, and the predefined corner fold line 120 define a first push-in panel 132 and a second push-in panel 134 that are generally rectangular in shape on push-in feature 130.

Figure 19:
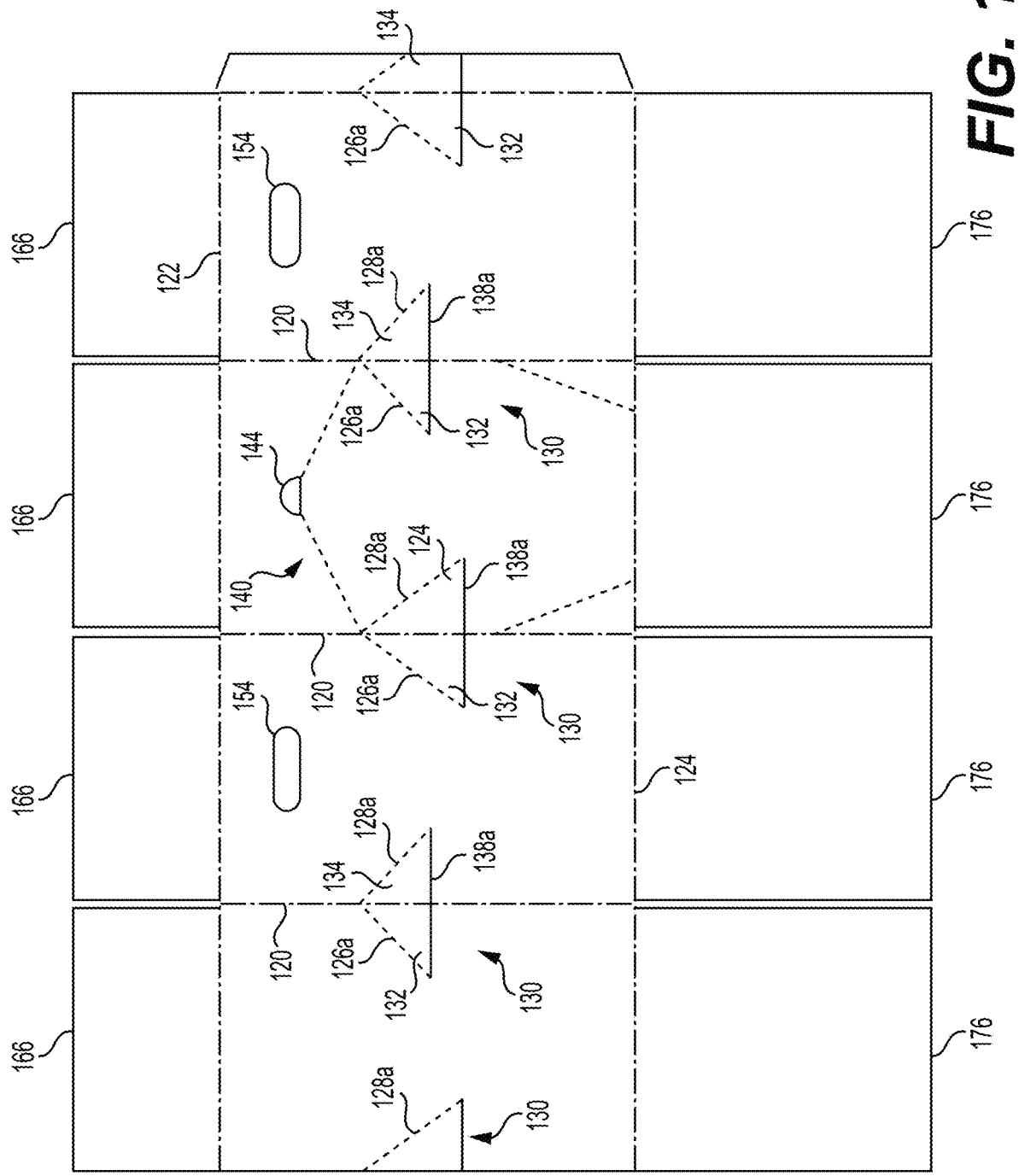
FIG. 19 is a plan view of another example of an unassembled packaging container.
Figure 21:
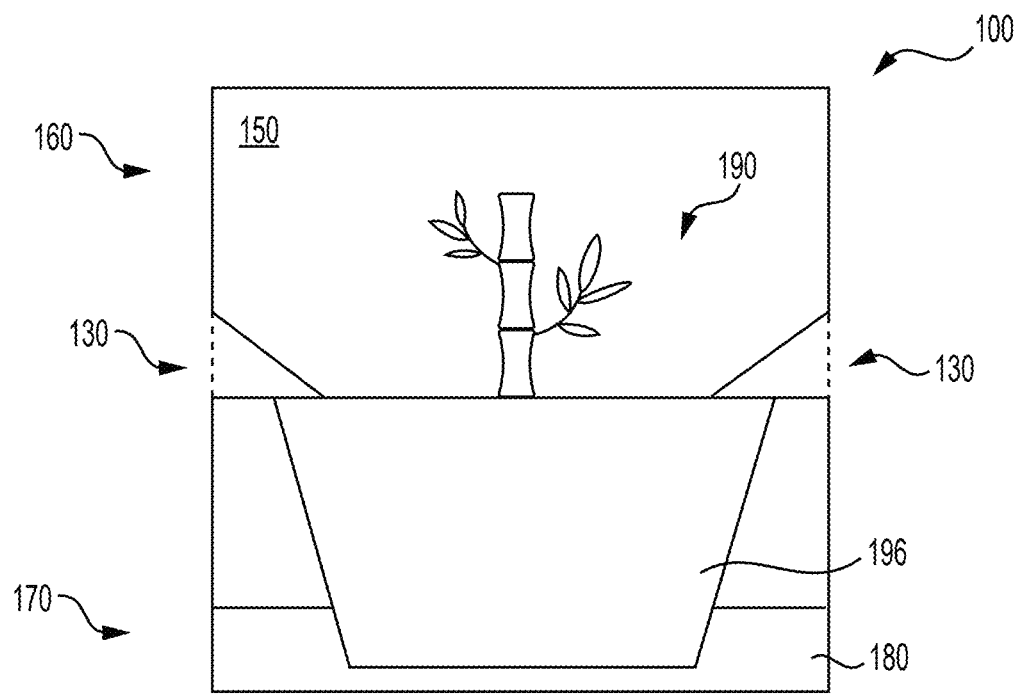
FIG. 21 is a cross-sectional side view of one example of an assembled packaging container.

In an example, push-in feature 130 may have a generally triangular shape. FIGS. 19 and 21 are exemplary illustrations of a packaging container 100 having triangular shaped push-in features 130. In an example, push-in feature 130 may be defined by various creases, cuts, perforations, and the like on packaging container 100 such that the push-in feature 130 may be configured to have a triangular shape. In an example, push-in feature 130 may be defined by at least a bottom horizontal cut 138a that is perpendicular to the predefined corner fold line 120. Bottom horizontal cut 138a may extend across the first sidewall panel 112 and the second sidewall panel 114 in generally equal portions. In an example, push-in feature 130 is further defined by a first angled fold line 126a and a second angled fold line 128a that are equally spaced from the predefined corner fold line 120. First angled fold line 126*a* and second push-in fold line 128 may extend at an angle from bottom second horizontal cut 138*a* to the predefined corner fold line 120 to form a triangular shape. First angled fold line 126*a* and second angled fold line 128*b* may be creases, cuts, perforations, or any other means suitable for creating a weakness along each respective fold line. Together, the combination of first angled fold line 126*a*, second angled fold line 128*a*, bottom horizontal cut 138*a*, and the predefined corner fold line 120 define a first push-in panel 132 and a second push-in panel 134 that are generally triangular in shape on push-in feature 130.

In an example, push-in feature 130 may be configured to move between a first configuration 125 and a second configuration 127. In the first configuration 125, first push-in panel 132 and second push-in panel 134 are substantially aligned with the first sidewall panel 112 and second sidewall panel 114, respectively. In the second configuration 127, the push-in feature 130 is offset from the first sidewall panel 112 and the second sidewall panel 114. In an example, the push-in feature extends into the internal volume 150 when in the second configuration 127. In an example, push-in feature 130 is configured to abut and hold a potted plant 190 securely in place while being transported.

In an example, the packaging container 100 includes a tear-away piece 140 located on at least one sidewall panel of the plurality of sidewall panels 110. Tear-away piece 140 may be defined by a predefined tear-away line 142. In an example, tear-away piece 140 may be defined by two or more predefined tear-away lines 142. Predefined tear-away line 142 may be a crease, perforation, cut, or any other means suitable for creating a weakness in packaging container 100 such that tear-away piece 140 may be disconnected from packaging container 100 along the tear-away line 142.

In an example, a tear-away hole 144 may be located along tear-away line 142. Tear-away hole 144 may have a dome or circular shape suitable for a person to use a finger and pull tear-away piece 140 away from packaging container 100. Tear-away piece 140 may be of any shape or configuration to provide easy access to, for example, a potted plant 190, or any other product 152 located inside packaging container 100.

In an example, a handle 154 may be disposed on packaging container 100. In an example, handle 154 may be located on one or more of the plurality of sidewall panels 110. Handle 154 may be defined by a cut, perforation, a combination thereof, or any means suitable for removing a portion of the packaging container 100 such that a handle 154 may be pushed out or formed in a sidewall panel 110. In an example, handle 154 is generally rectangular or generally circular and generally oblong in shape. Handle 154 may be a cutout such that it affords access to internal volume 150. Handle 154 may be generally proportioned to accommodate a person's hand to extend into the internal volume 150. In an example, handle 154 is located in a top portion 160 of the packaging container 100. In an example, handle 154 may be located on a top panel 166 of the plurality of sidewall panels 110.

In an example, the plurality of sidewall panels 110 define a top portion 160. Top portion 160 may define a top opening 162 that affords access to internal volume 150. Top portion 160 may include a plurality of top panels 166 that define a top wall 164. The plurality of top panels 166 may be defined by a top fold line 122. Top fold line 122 may be a crease, perforation, cuts, or any means suitable for creating a weakness such that the packaging container 100 may buckle along the top fold line 122.

The plurality of top panels 166 may be generally rectangular or triangular in shape based upon the number of top panels 166. In an example, the plurality of top panels 166 may fully overlap each other such that the top wall 164 is generally flat. In an example, the plurality of top panels 166 may be configured such that the top wall 164 is gabled. A gabled top wall 164 may be advantageous for many reasons including providing extra room in the packaging container 100 for taller potted plants 190, extra room in packaging container 100 for hanging potted plants 190, and reducing risk of the packaging container 100 being transported upside down and potentially damaging potted plant 190.

Figure 5:
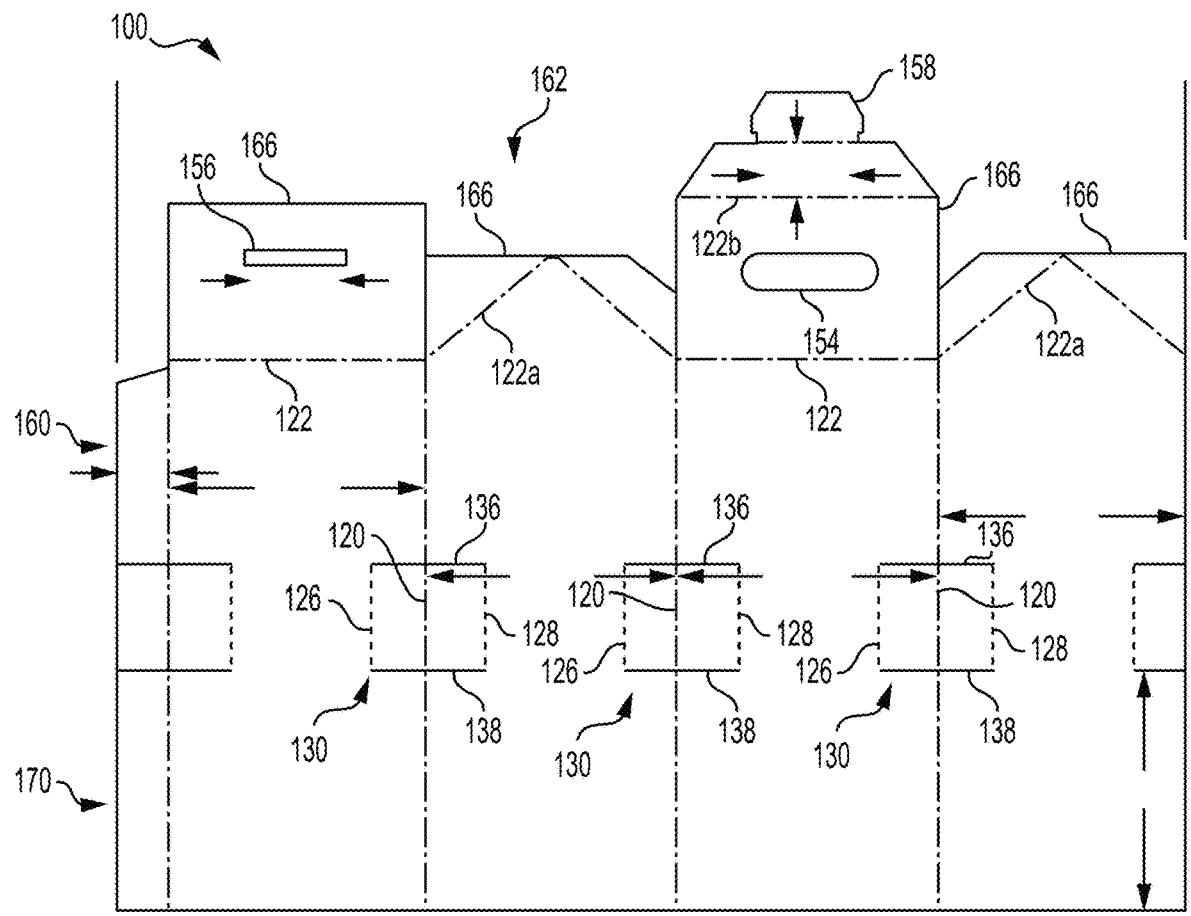
FIG. 5 is a plan view of yet another example of an unassembled packaging container.
Figure 6:
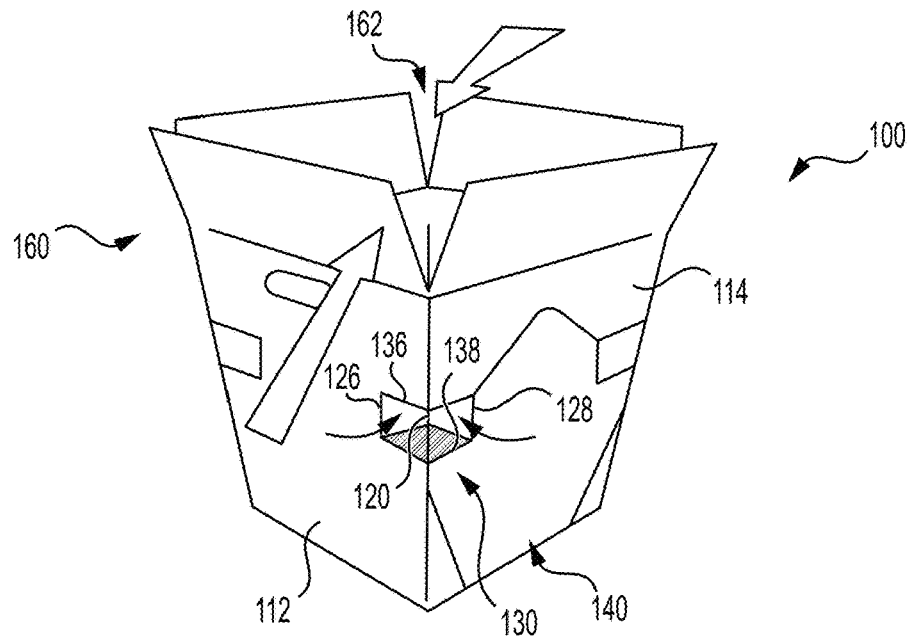
FIG. 6 is a perspective view of one example of a partially assembled packaging container.

As illustrated in FIG. 5, the plurality of top panels 166 may include a mixture of panels 166 having different heights, shapes, and features to form a gabled top wall 165. In an example, one of the plurality of top panels 166 may include a tab 158 and a tab fold line 122*b*. A different top panel 166 of the plurality of top panels 166 may include a slit 156 configured to nest with tab 158. One or more of the plurality of top panels 166 may include a gable fold line 122*a*. Gable fold line 122*a* may be a crease, perforation, cut, or any other means suitable for creating a weakness such that top panel 166 may buckle along gable fold line 122*a*.

In any of the above-described configurations of top wall 164, the plurality of top panels 166 may adhere to each other and to the packaging container 100 with tape, glue, and any other adhesive suitable for securing the plurality of top panels 166 such that they form a top wall 164. In an example, top wall 164 may be secured by nesting together without any tape, glue, or other adhesives.

In an example, the plurality of sidewall panels 110 define a bottom portion 170. Bottom portion 170 may define a bottom opening 172 that affords access to internal volume 150. Bottom portion 170 may include a plurality of bottom panels 176 that define a bottom wall 174. The plurality of bottom panels 176 may be defined by a bottom fold line 124. Bottom fold line 124 may be a crease, perforation, cuts, or any other means suitable for creating a weakness such that the packaging container 100 may buckle along the bottom fold line 124.

The plurality of bottom panels 176 may be generally rectangular or triangular in shape based upon the number of bottom panels 176. In an example, the plurality of bottom wall panels 176 may fully overlap each other such that the bottom wall 174 is generally flat. In an example, the plurality of bottom panels 176 may abut each other along a bottom wall outer edge 176*a* such that the bottom wall 174 is generally flat. In an example, the plurality of bottom panels 176 may include both overlapped and abutting configurations. In an example, bottom wall 174 may be coated in a water-resistant coating 168. The plurality of bottom panels 176 may adhere to each other and to the packaging container 100 with tape, glue, and any other adhesive suitable for securing the plurality of bottom panels 176 such that they form a bottom wall 174.

Figure 7:
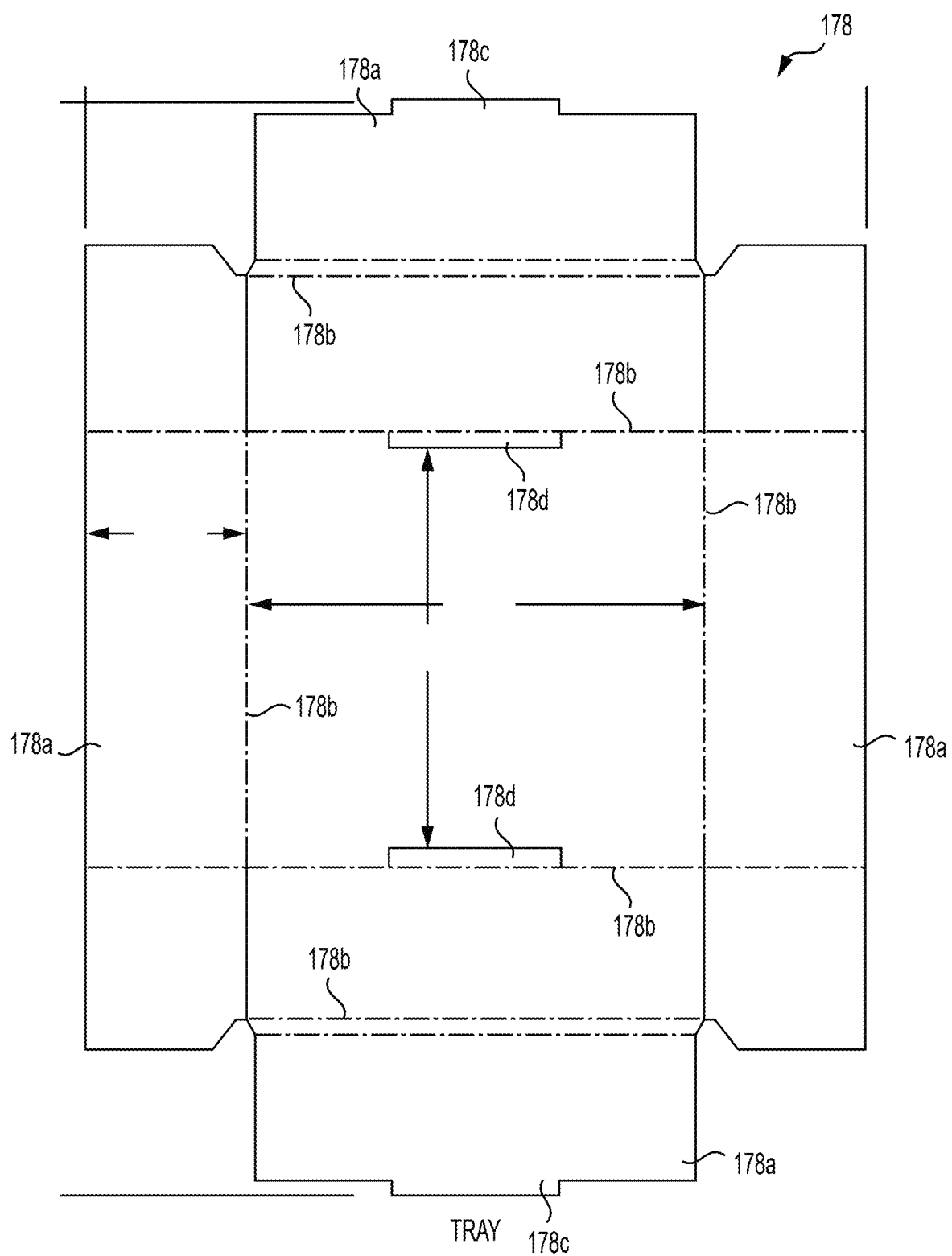
FIG. 7 is a plan view of one example of a tray.

FIG. 7 illustrates an example of an unassembled bottom tray 178. In an example, a bottom tray 178 may be configured to nest around and cover the bottom opening 172. Bottom tray 178 may have a plurality of tray panels 178*a* defined by a plurality of predefined tray folds 178*b*. The predefined tray folds 178*b* may be creases, perforation, cuts, or any other means suitable to create a weakness such that the bottom tray 178 may buckle along the predefined tray folds 178*b*. Bottom tray 178 may include one or more tray tabs 178c configured to nest with tray cutouts 178d. In an example, bottom tray 178 may be generally rectangular or generally triangular. In an example, bottom tray 178 may be attached to the packaging container 100 with tape to allow easy detachment or cutting along the tape once the packaging container 100 arrives at its destination. In an example, bottom tray 178 may be coated in a water-resistant coating 168 to prevent water damage occurring during transport.

Figure 8:
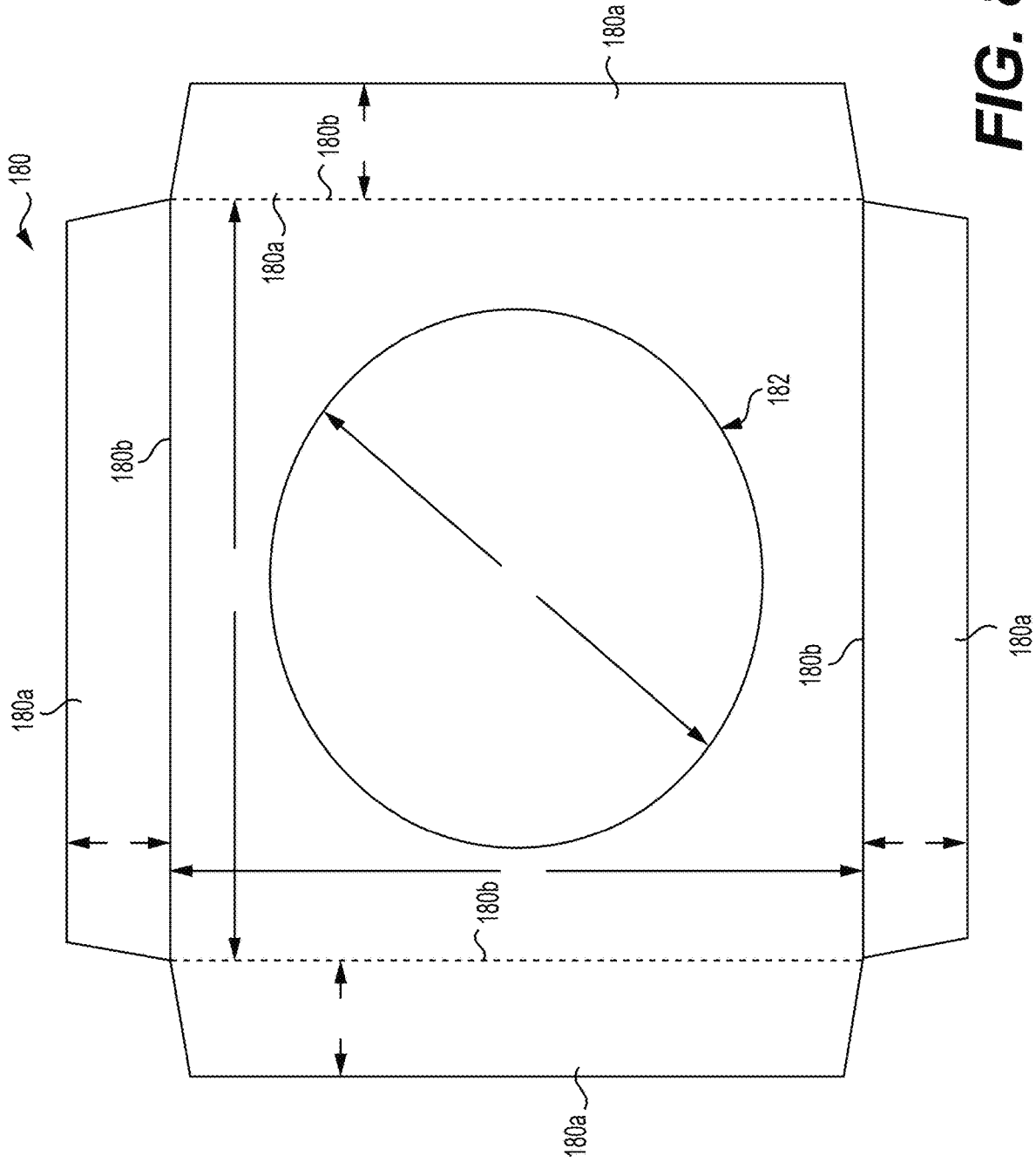
FIG. 8 is a plan view of one example of an insert.
Figure 9:
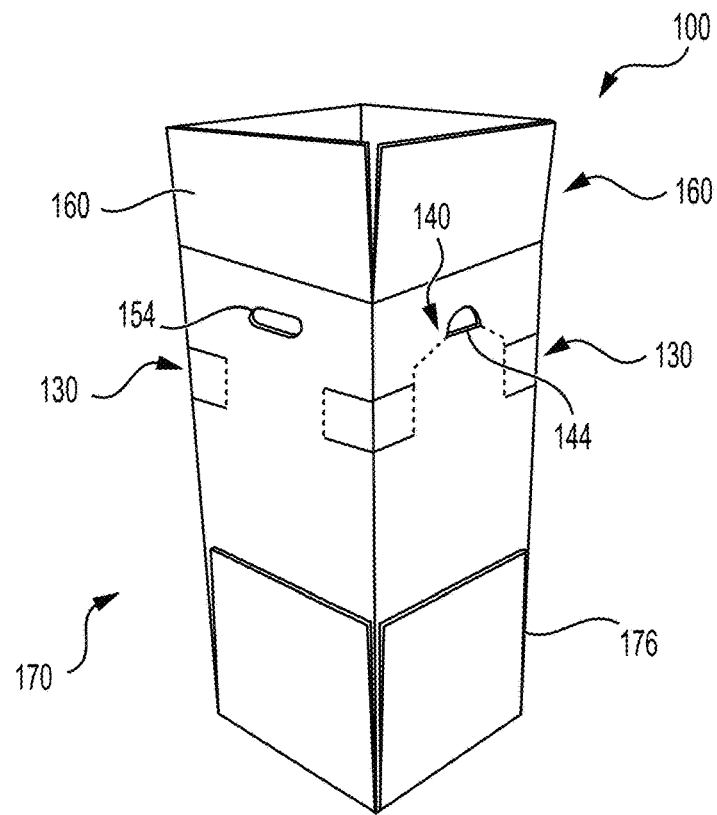
FIG. 9 is a perspective view of another example of a partially assembled packaging container.
Figure 10:
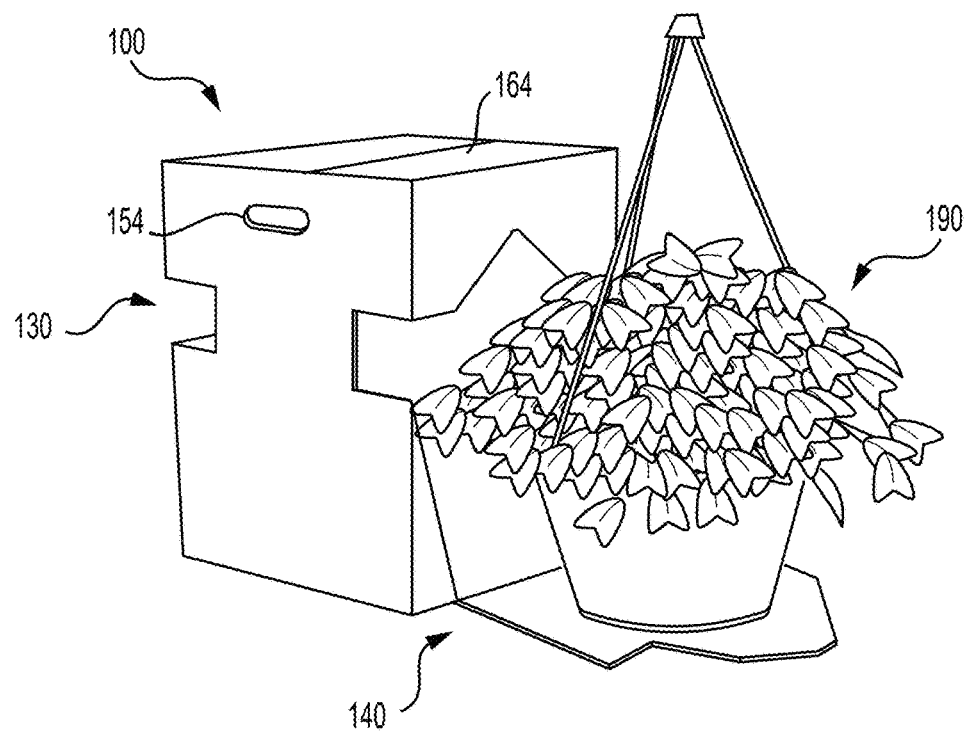
FIG. 10 is a perspective view of one example of a packaging container and a potted plant.
Figure 11:
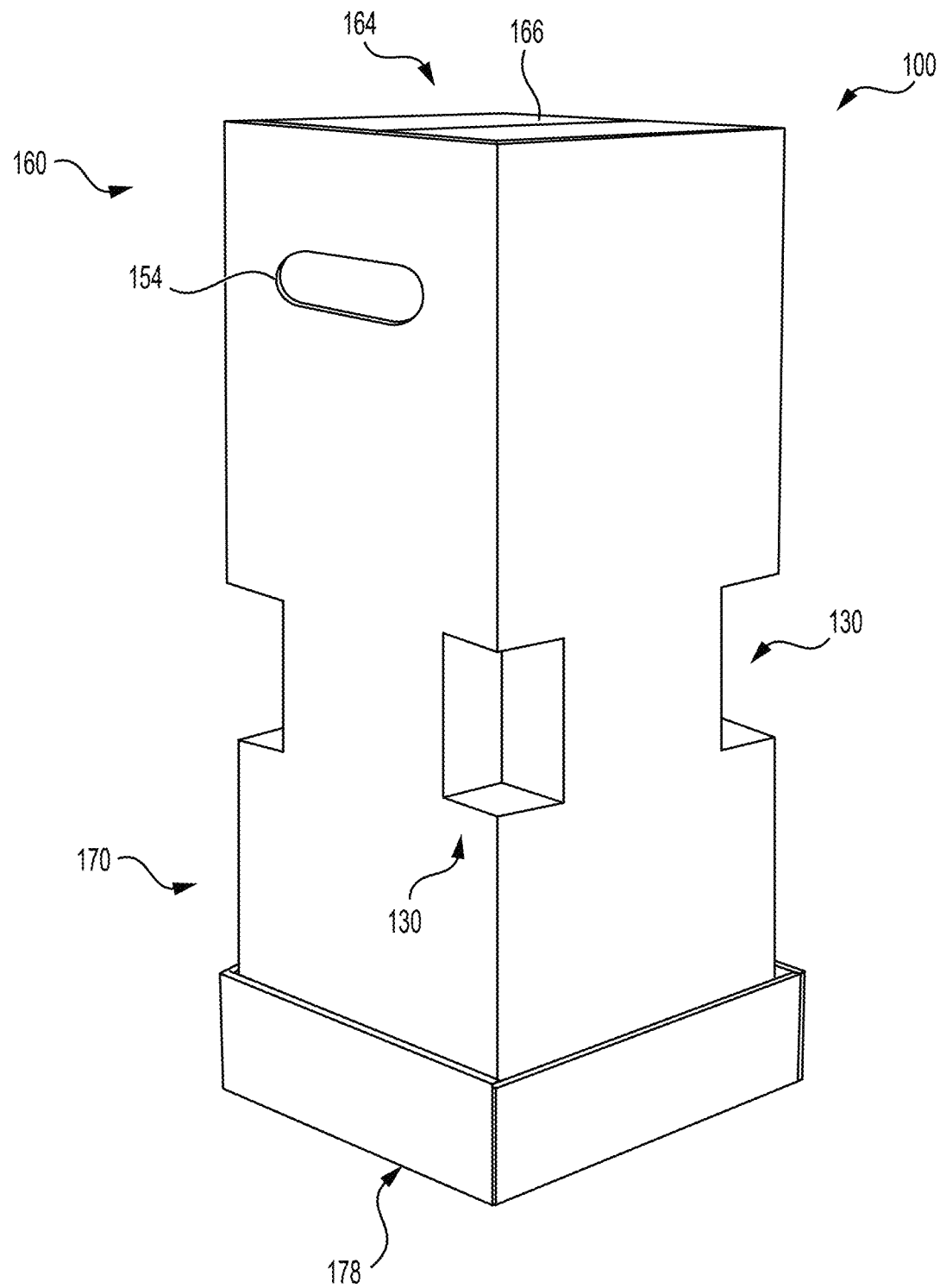
FIG. 11 is a perspective view of one example of an assembled packaging container.
Figure 12:
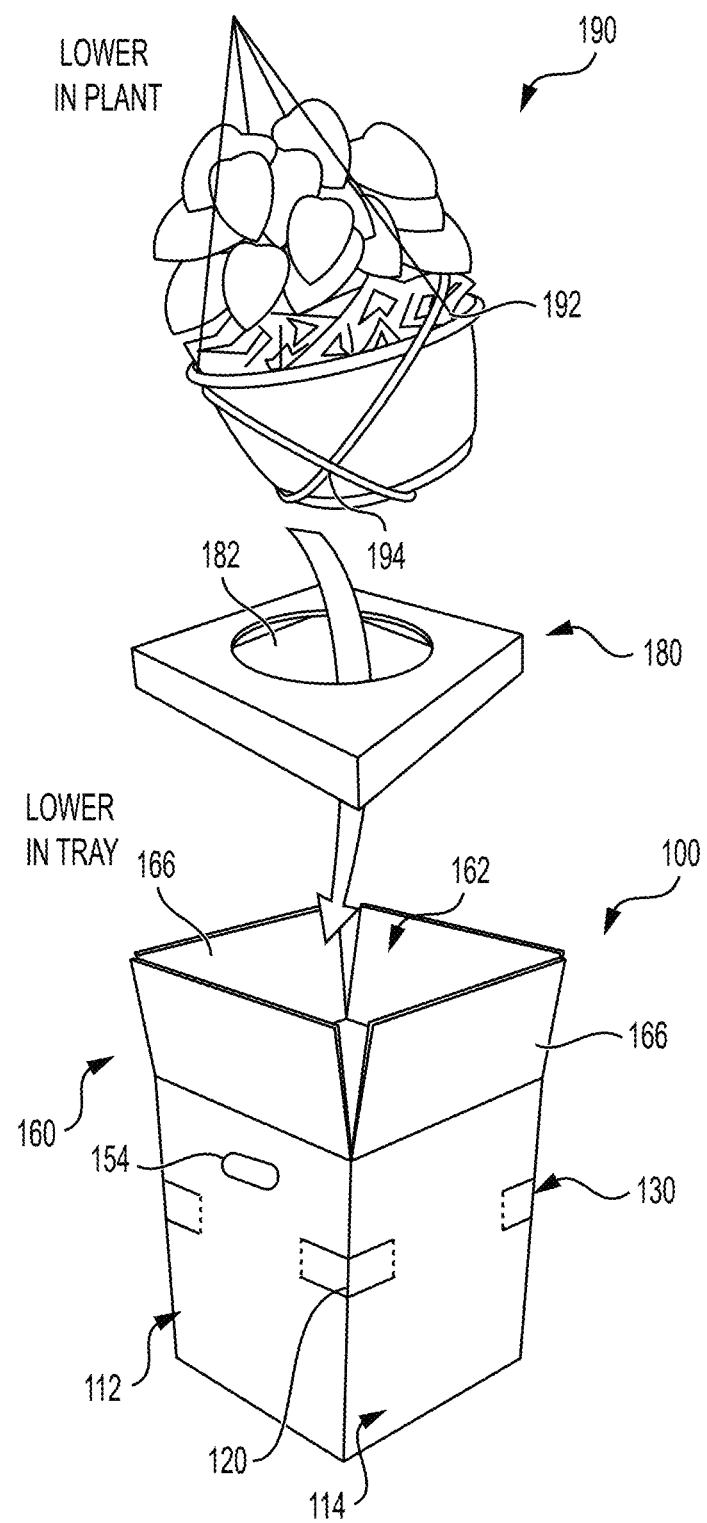
FIG. 12 is a schematic of the assembly of a potted plant, an insert, and a packaging container system.
Figure 13:
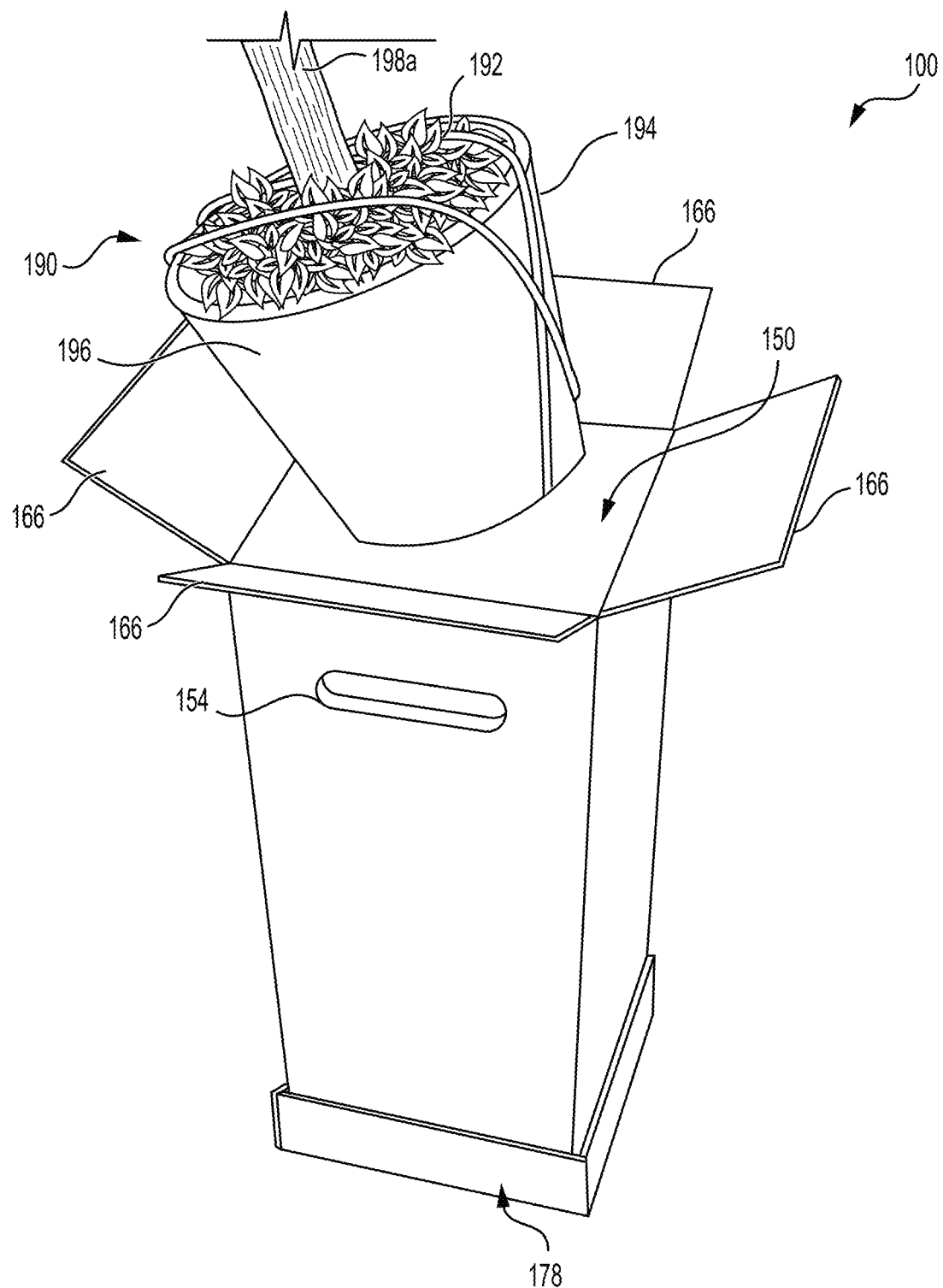
FIG. 13 is a perspective view of a potted plant and a packaging container.
Figure 14:
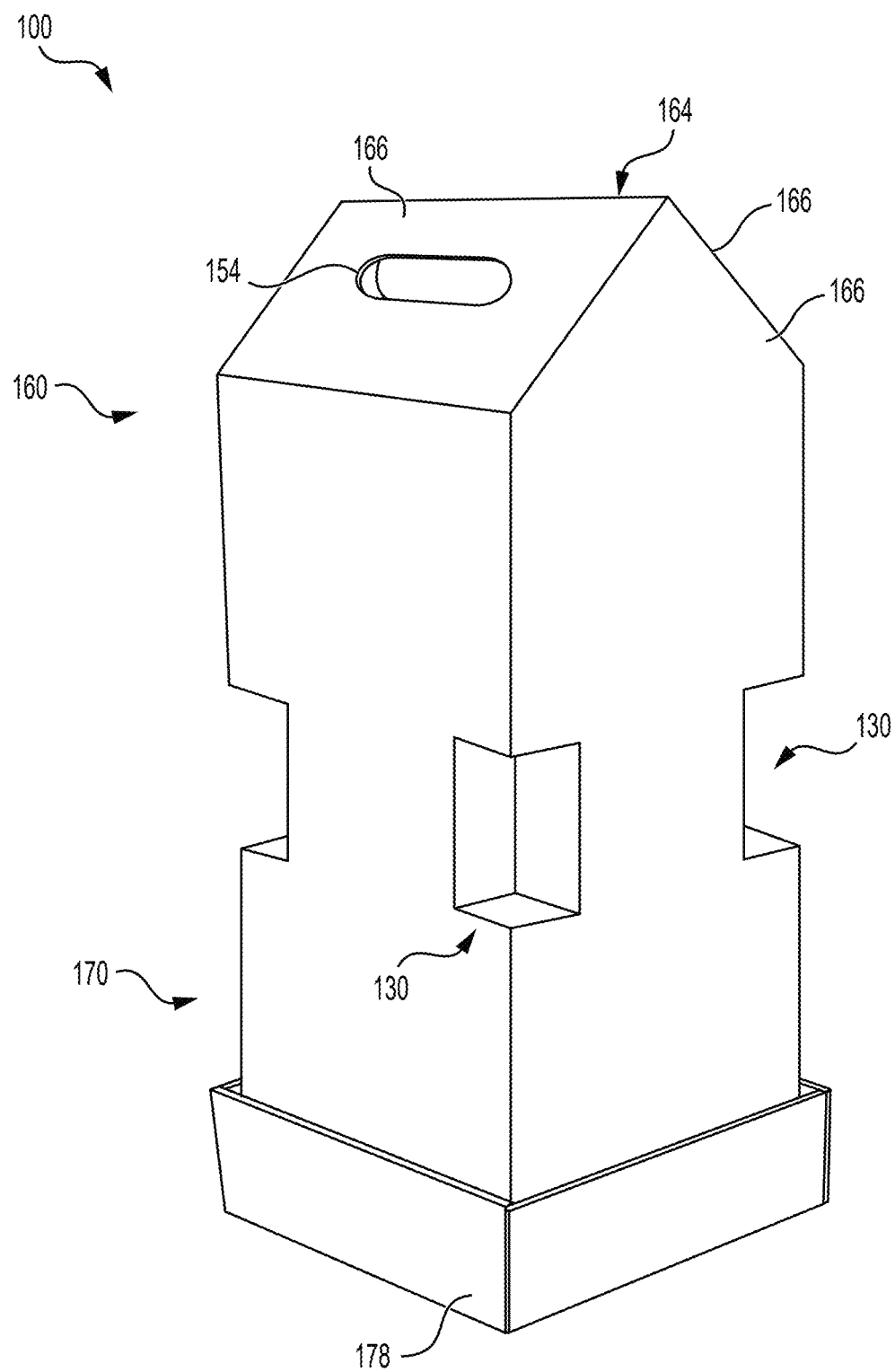
FIG. 14 is a perspective view of one example of an assembled packaging container.
Figure 15:
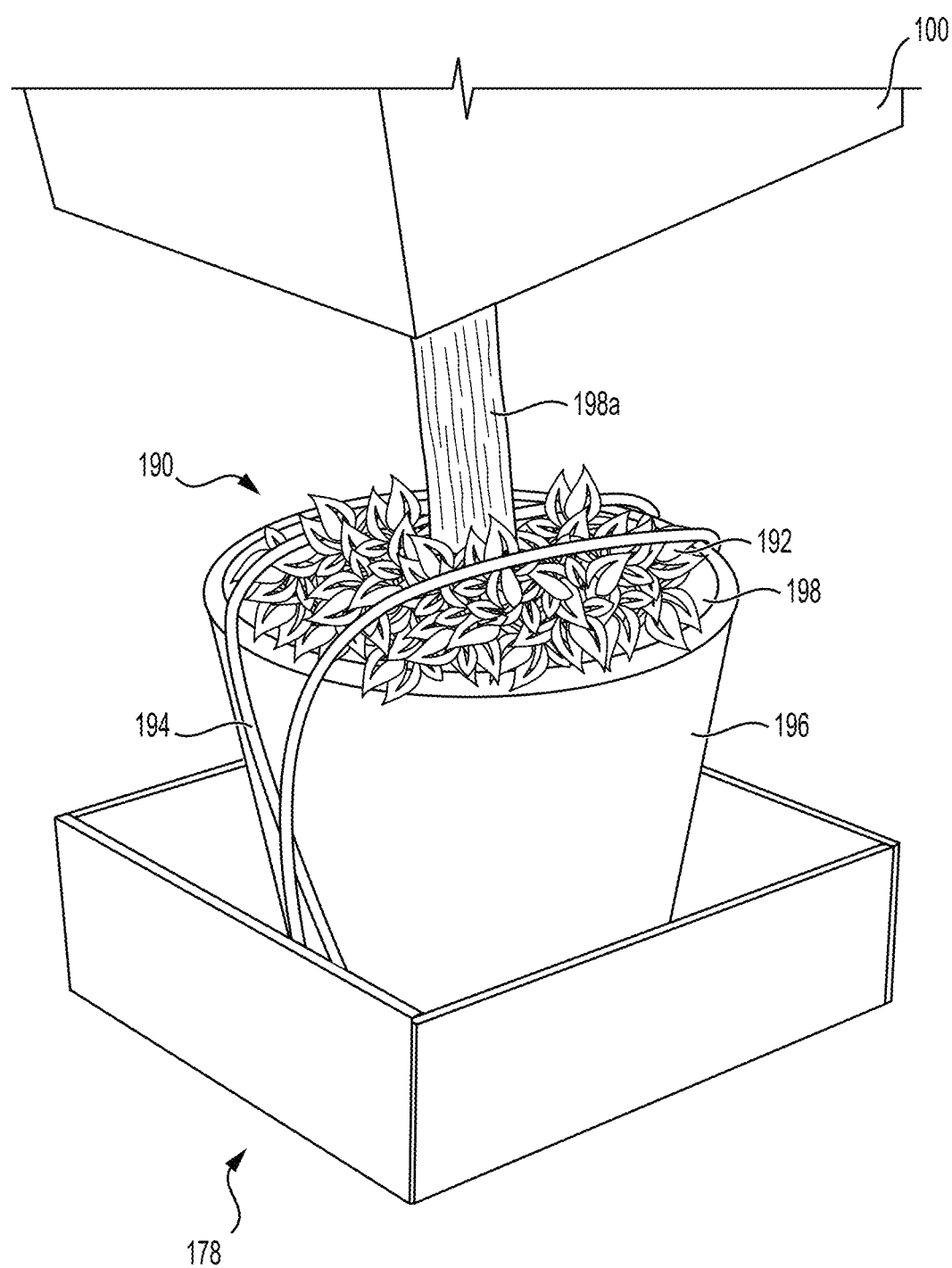
FIG. 15 is a perspective view of one example of a tray, a potted plant, and a packaging container.

FIG. 8 illustrates an example of an unassembled insert 180. In an example, packaging container 100 may include an insert 180. Insert 180 may be located in the bottom portion 170 of packaging container 100 or in a bottom tray 178. Insert 180 may include a plurality of insert panels 180a defined by a plurality of predefined insert folds 180b. Predefined insert folds 180b may be a crease, perforation, cuts, or any other means suitable for weakening the insert 180 such that it may buckle along the predefined insert folds 180b. Insert 180 may be generally rectangular or generally triangular in shape. Insert 180 may be coated in a water-resistant coating 168 to prevent water damage occurring during transport.

Insert 180 may have a cutout 182 in one of the plurality of insert panels 180a. The cutout 182 may be generally circular or generally rectangular in shape. The cutout 182 may be configured to hold a potted plant 190 in a generally secure position such that the potted plant 190 will not tip over or move into the plurality of sidewall panels 110 during transport. In an example, cutout 182 of insert 180 is located on an insert panel 180a that is generally parallel to bottom wall 174.

Figure 16:
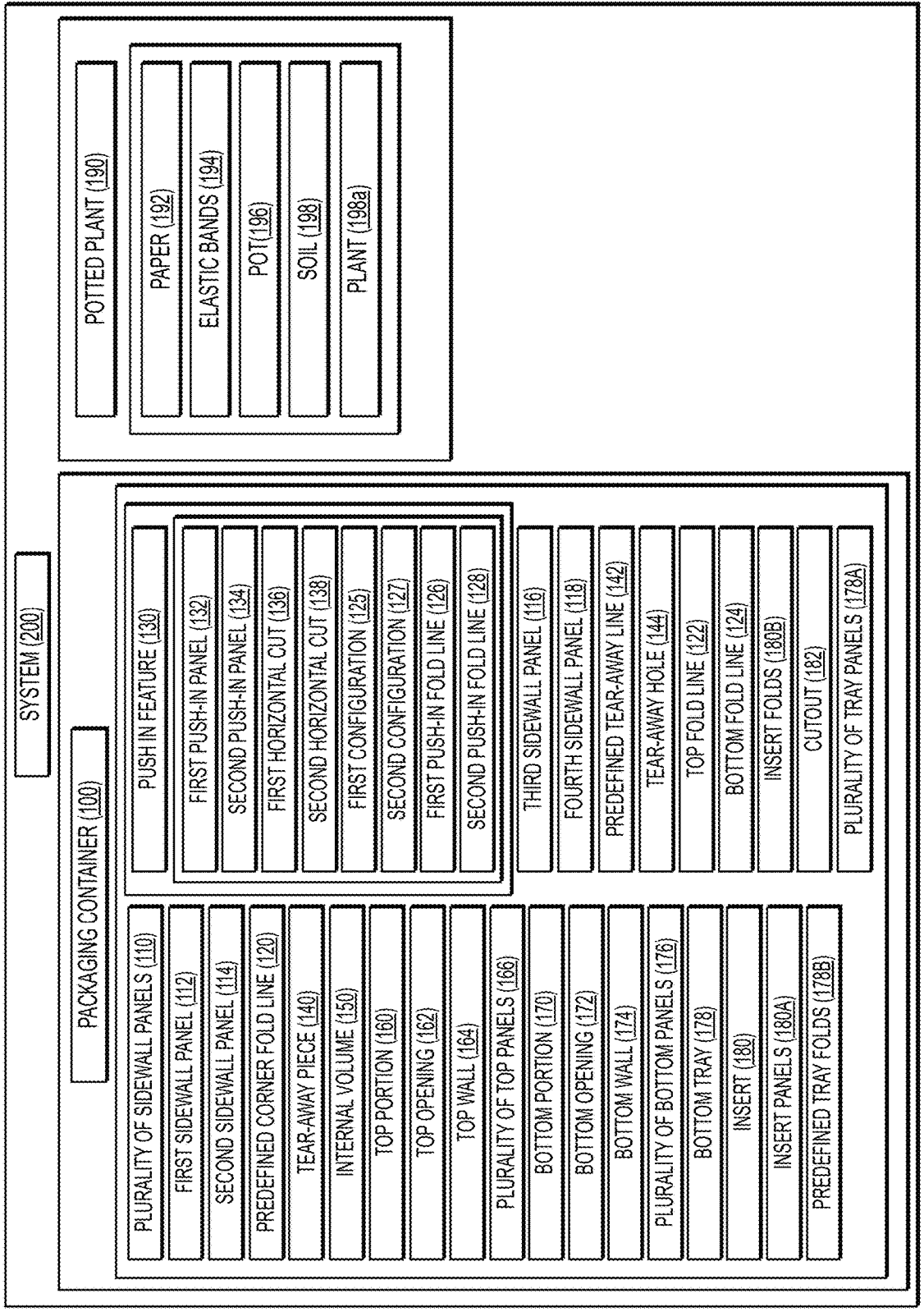
FIG. 16 is a block diagram of a system that may be used with the packaging containers of FIGS. 1-15.

FIG. 16 illustrates a system 200. System 200 may include a packaging container 100 and its components as described and shown in the various examples above as well as in the Figures. System 200 may further include a potted plant 190 and shown in described above and in the Figures. Packaging container 100 may be comprised of corrugated paperboard, cardboard, or any suitable material for safely transporting a potted plant 190. In an example, packaging container 100 includes a plurality of sidewall panels 110 that are configured to define an internal volume 150, at least one push-in feature 130, at least one tear-away piece 140, and a top wall 164.

Figure 20:
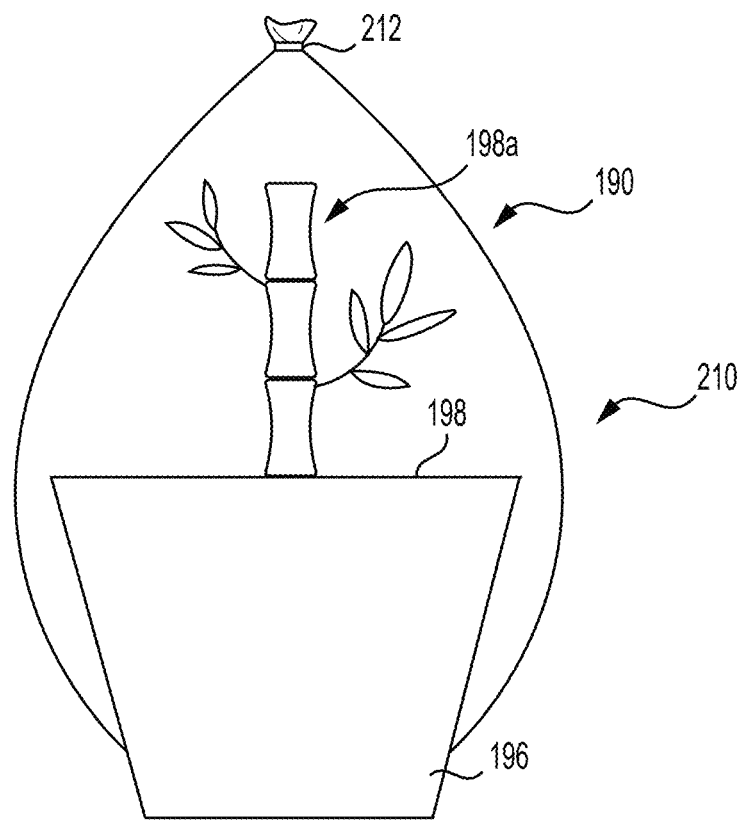
FIG. 20 is a cross-sectional side view of one example of sleeve wrapped around a potted plant.

In an example, the potted plant 190 of system 200 may include a pot 196, soil 198, and a plant 198a. Potted plant 190 may be generally tapered in shape. In an example, the system 200 may include paper 192 located on top of the soil 198 such that the paper 192 helps ensure the soil 198 stays in the pot 196 and does not move about the packaging container 100 during transport. The system 200 may further include a plurality of elastic bands 194 that may be located on and wrapped around the potted plant 190 and are configured to stabilize the soil 198 and plant 198a in the pot 196 during transport. FIG. 20 illustrates an example of a sleeve 210. Sleeve 210 may be generally tapered such that it may fit around potted plant 190. Sleeve 210 may be of plastic, paper, or any other material suitable for protecting potted plant 190 from losing soil 198 or encountering damage during transport. Sleeve 210 may be secured by a clamp 212. Clamp 212 may be a twist tie, band, or any other means suitable for securing sleeve 210 closed above potted plant 190.

Figure 17:
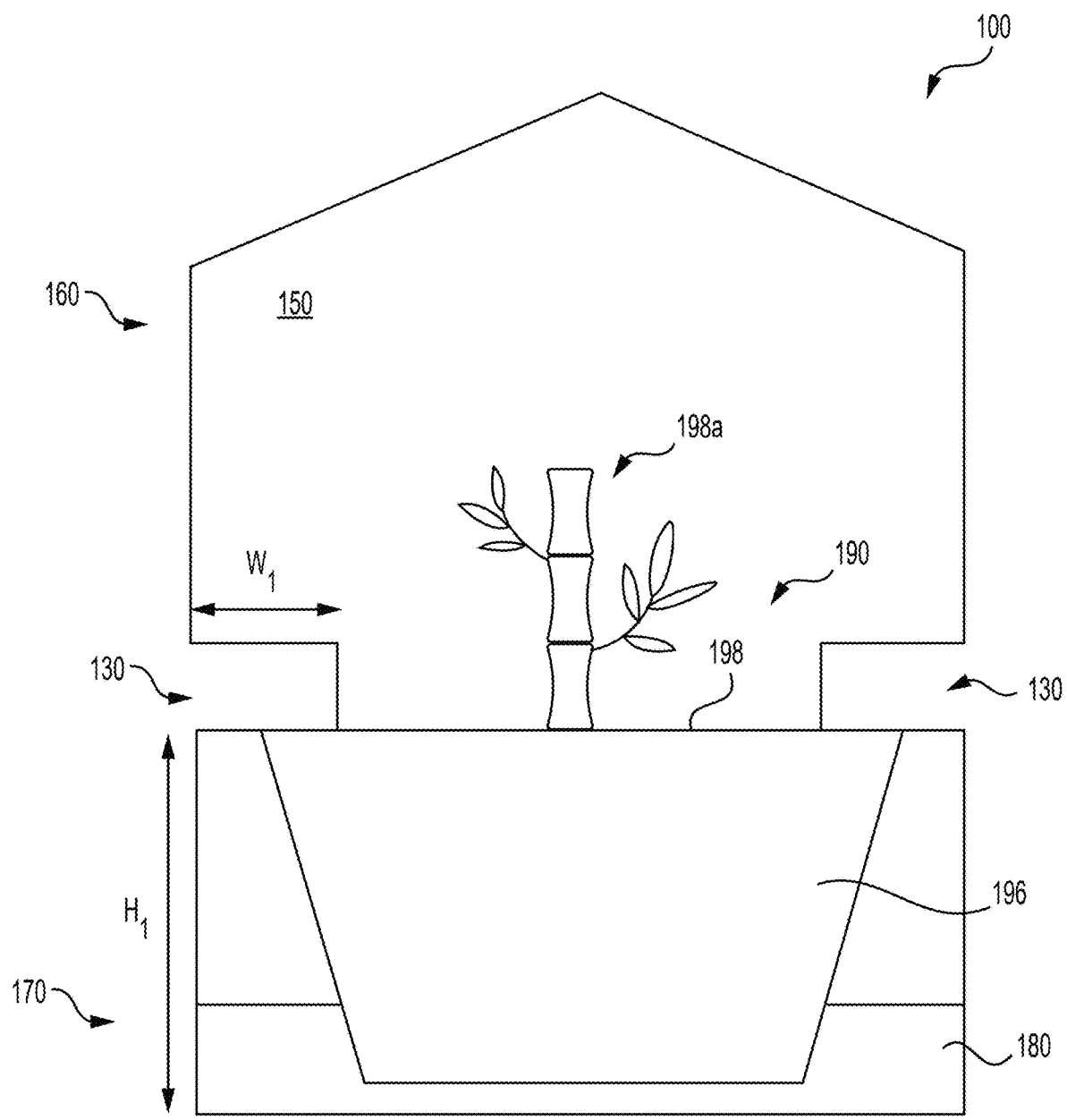
FIG. 17 is a cross-sectional side view of one example of an assembled packaging container.

FIG. 17 illustrates an example of a packaging container 100 of system 200 that is configured such that the at least one push-in feature 130 abuts the soil 198 and pot 196 of the potted plant 190. The at least one push-in feature 130 may be configured such that it holds the potted plant 190 in a secure position such that it will not jostle or move about the packaging container 100 during transport. Push-in feature 130 may extend into the internal volume 150 a width w1 that is determined based upon the dimensions of the potted plant 190 such that push-in feature 130 covers a portion of the pot 196 and soil 198 without damaging the plant 198a. Push-in feature 130 may be located at a height h1 from bottom wall 174 that is determined based upon the dimensions of the potted plant 190 such that push-in feature 130 covers a portion of the pot 196 and soil 198 without damaging the plant 198a.

In an example, the packaging container 100 of system 200 includes a bottom portion 170 as described above configured to house the potted plant 190. In an example, the packaging container 100 of system 200 includes a bottom tray 178 as described above configured to house the potted plant 190. The bottom tray 178 is configured to abut the bottom portion 170 such that it may be removably attached to the packaging container 100 via tape, glue, or any other means of removably adhering the bottom tray 178 to the packaging container 100. Bottom tray 178 may be coated in a water-resistant coating 168.

In an example, the system 200 includes an insert 180 as described and shown in the various examples above and in the Figures. Insert 180 may be configured to house potted plant 190 of system 200 such that the potted plant 190 may nest in insert 180. In an example, insert 180 may be located in the bottom portion 170 of packaging container 100. In an example, insert 180 may be located in a bottom tray 178 of packaging container 100. Insert 180 may be coated in a water-resistant coating 168.

Figure 18:
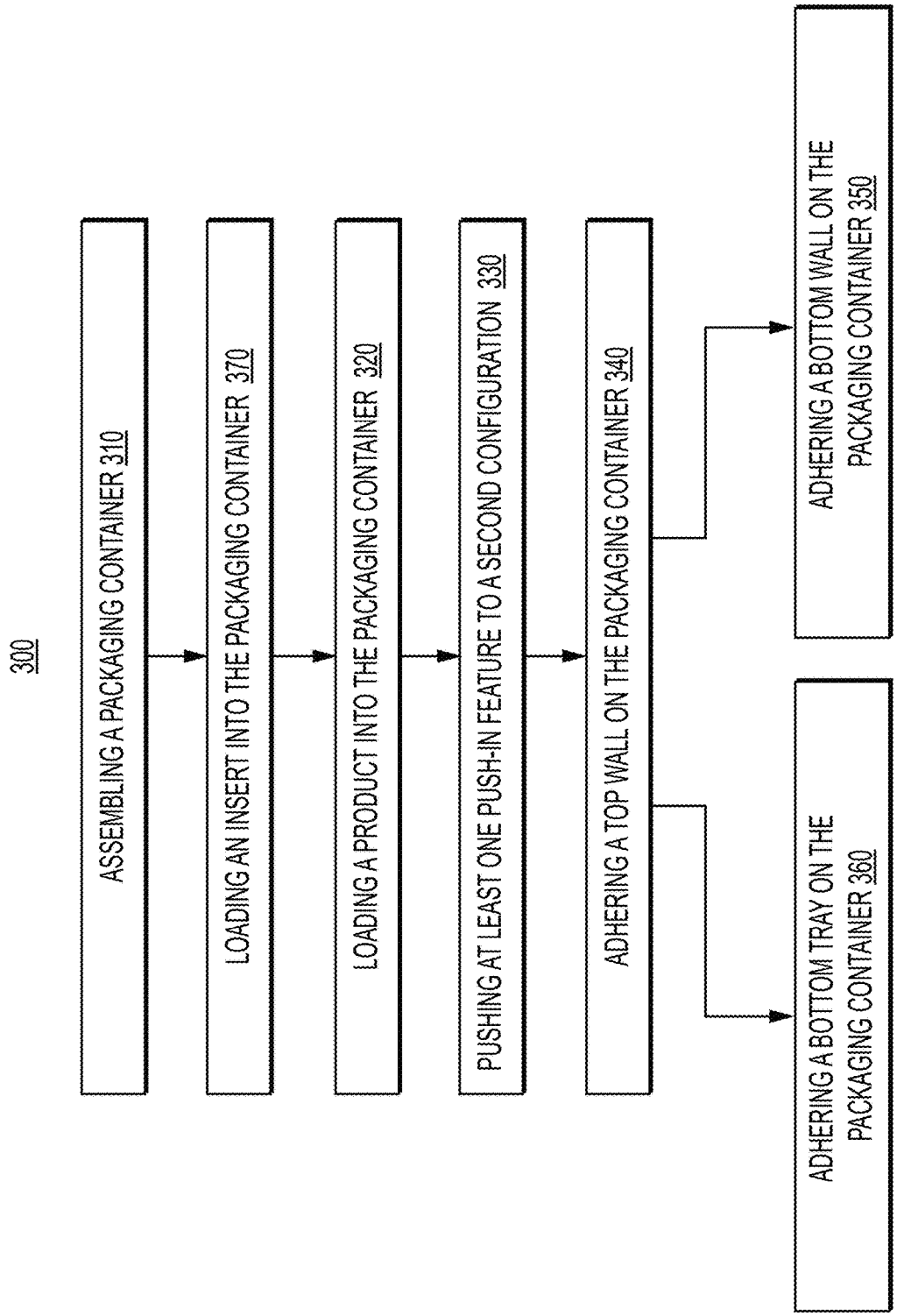
FIG. 18 is a flowchart illustrating a method for packaging a product as shown in FIGS. 1-15.

FIG. 18 illustrates a method 300 for packaging a product 152. Method 300 may include assembling 310 a packaging container 100 as shown and described above and in the Figures. The assembling 310 of method 300 may include buckling along one or more of the predefined corner fold lines 120 that define a plurality of sidewall panels 110 and form a desired packaging container 100 configuration. The packaging container 100 may be generally rectangular or triangular in shape based upon the number of sidewall panels 110 and the product 152 located in the internal volume 150 of the packaging container 100.

Once the packaging container 100 is assembled, the method 300 may include loading 370 an insert 180 into the packaging container 100. The insert 180 may be configured to hold a potted plant 190 securely within the internal volume 150 of the packaging container 100 such that it does not jostle or move around the packaging container 100 during transport. In an example, the method 300 may include loading 320 a potted plant 190 into the packaging container 100. The potted plant 190 may be loaded into the internal volume 150 of the packaging container 100 via top opening 162 or bottom opening 172. In the event an insert 180 was loaded 370 into the packaging container 100, the potted plant 190 may nest in the insert 180 when loaded into the packaging container 100.

In an example, the method 300 may include moving 330 (e.g., pushing in) one or more push-in features 130 from a first configuration 125 to a second configuration 127. The push-in features 130 are configured to be located in the internal volume 150 and abut the potted plant 190 when in the second configuration 127. Once the moving 330 occurs, the potted plant 190 may be contained such that it will be unable to move freely about the internal volume 150 of the packaging container 100.

In an example, the method 300 may include adhering 340 a top wall 164 of packaging container 100. Top wall 164 may be defined by a plurality of top panels 166. The plurality of top wall panels 166 may be rectangular or triangular in shape based upon the number of top panels 166. In an example, the top wall 164 is formed of overlapping top panels 166 such that the top wall 164 is flat.

In an example, top wall 164 is formed of abutting top panels 166 such that the top wall 164 is gabled. Forming a gabled top wall 164 may include pushing a gable fold line 122*a*, pushing a tab fold line 1228, and inserting a tab 158 into a slit 156. In an example, adhering 340 may include using glue, tape, or any other means suitable for adhering the top panels 166 to each other and to the packaging container 100 to form a flat or gabled top wall 164.

In an example, method 300 includes adhering 350 a bottom wall 174 to the bottom portion 170 of packaging container 100. The bottom wall 174 may be defined by a plurality of bottom panels 176. The plurality of bottom panels 176 may be generally rectangular or triangular in shape based upon the number of bottom panels 176. In an example, bottom wall 174 is formed of overlapping bottom panels 176 such that the bottom wall 174 is generally flat. Bottom wall 174 may be coated in a water-resistant coating 168. In an example, bottom wall 174 is formed of abutting bottom panels 176 such that the bottom wall 174 is generally flat. In an example, adhering 350 may include using glue, tape, or any other means suitable for adhering the bottom wall 174 bottom panels 176 to each other and to the packaging container 100.

In an example, method 300 includes adhering 360 a bottom tray 178 to the bottom portion 170 of packaging container 100. Bottom tray 178 may be defined by a plurality of tray panels 178*a*. Bottom tray 178 may be generally rectangular or generally triangular in shape. Bottom tray 178 may be coated in a water-resistant coating 168. Adhering 360 may include using tape, glue, or any other means suitable for adhering the bottom tray 178 to the bottom portion 170 of the packaging container 100.

Although various examples of the disclosed packaging containers and associated systems and packaging methods have been shown and described, modifications may occur to those skilled in the art upon reading the specification. The present application includes such modifications and is limited only by the scope of the claims.

What is claimed is:

1. A packaging container comprising:
a plurality of sidewall panels that define an internal volume, the plurality of sidewall panels comprising at least a first sidewall panel and a second sidewall panel connected to the first sidewall panel along a predefined corner fold line;
a push-in feature located on the predefined corner fold line,
wherein the push-in feature is movable between a first configuration and a second configuration; and
a tear-away piece located on at least one sidewall panel of the plurality of sidewall panels,
wherein the tear-away piece is defined by at least one predefined tear-away line that extends to the push-in feature.

2. The packaging container of claim 1 wherein the push-in feature comprises a first push-in panel and a second push-in panel.

3. The packaging container of claim 2 wherein the first push-in panel is substantially aligned with the first sidewall panel and the second push-in panel is substantially aligned with the second sidewall panel when the push-in feature is in the first configuration.

4. The packaging container of claim 2 wherein the push-in feature extends into the internal volume when the push-in feature is in the second configuration.

5. The packaging container of claim 1 wherein the push-in feature is defined by a first horizonal cut and a second horizonal cut spanning a portion of the first sidewall panel and a portion of the second sidewall panel, the predefined corner fold line, and a first push-in fold line and a second push-in fold line disposed on either side of the predefined corner fold line and between the first horizonal cut and second horizonal cut.

6. The packaging container of claim 1 wherein the plurality of sidewall panels comprise a top portion that defines a top opening.

7. The packaging container of claim 1 wherein the plurality of sidewall panels comprise a bottom portion that defines a bottom opening.

8. The packaging container of claim 1 comprising a bottom wall defined by a plurality of bottom panels.

9. The packaging container of claim 8 wherein the bottom wall is coated with a water-resistant coating.

10. The packaging container of claim 1 comprising a bottom tray.

11. The packaging container of claim 10 wherein the bottom tray is coated with a water-resistant coating.

12. The packaging container of claim 1 comprising a top wall defined by a plurality of top panels.

13. The packaging container of claim 12 wherein the top wall is flat.

14. The packaging container of claim 12 wherein the top wall is gabled.

15. The packaging container of claim 1 comprising an insert.

16. The packaging container of claim 15 wherein the insert is coated with a water-resistant coating.

17. The packaging container of claim 15 wherein the insert is configured to hold a potted plant.

18. A system comprising:
a potted plant; and
the packaging container of claim 1.

19. The system of claim 18 comprising elastic bands wrapped around the potted plant.

20. The system of claim 18 comprising a sleeve wrapped around the potted plant.

* * * * *